United States Patent [19]
Rogers

[11] Patent Number: 5,633,917
[45] Date of Patent: May 27, 1997

[54] REMOTE-CONTROL TELEPHONE ANSWERING SYSTEM AND METHOD

[76] Inventor: Laurence S. Rogers, 15 Aspen Rd., Scarsdale, N.Y. 10583

[21] Appl. No.: 462,633

[22] Filed: Jun. 5, 1995

Related U.S. Application Data

[63] Continuation-in-part of Ser. No. 342,093, Nov. 18, 1994, Pat. No. 5,579,377.

[51] Int. Cl.$^6$ ..................................................... H04M 1/00
[52] U.S. Cl. ................. 379/74; 379/67; 379/77; 379/373; 379/374
[58] Field of Search ........................ 374/67, 74, 77, 374/79, 81, 82, 88, 89, 177, 178, 179, 186, 187, 215, 372, 373, 374, 375, 377, 381, 402, 418, 102

[56] References Cited

U.S. PATENT DOCUMENTS

| | | | |
|---|---|---|---|
| 4,514,593 | 4/1985 | Hattori et al. | 379/80 |
| 4,578,540 | 3/1986 | Borg et al. | 379/200 |
| 4,584,434 | 4/1986 | Hashimoto | 379/100 |
| 4,598,900 | 7/1986 | Jackson | 379/77 |
| 4,682,353 | 7/1987 | Inoue et al. | 379/163 |
| 4,720,853 | 1/1988 | Szlam | 379/211 |
| 4,742,538 | 5/1988 | Szlam | 379/361 |
| 4,785,473 | 11/1988 | Pfeiffer et al. | 379/89 |
| 4,794,637 | 12/1988 | Hashimoto | 379/67 |
| 4,998,272 | 3/1991 | Hawkins, Jr. et al. | 379/88 |
| 5,027,393 | 6/1991 | Yamamura et al. | 379/410 |
| 5,050,160 | 9/1991 | Fuda | 370/32.1 |
| 5,146,489 | 9/1992 | Telibasa | 379/100 |
| 5,339,354 | 8/1994 | Becker et al. | 379/67 |
| 5,341,415 | 8/1994 | Baran | 379/201 |
| 5,432,844 | 7/1995 | Core et al. | 379/67 |

FOREIGN PATENT DOCUMENTS

| | | | |
|---|---|---|---|
| 58-148556 | 9/1983 | Japan | 379/74 |
| 62-11352 | 1/1987 | Japan | 379/74 |
| 64-848 | 1/1989 | Japan | 379/74 |
| 2-062148 | 3/1990 | Japan | 279/74 |

OTHER PUBLICATIONS

"Signal Control for Message Recording," J.T. Hollaway et al, IBM Technical Disclosure Bulletin, vol. 15, No. 12, May 1973, pp. 3854, 379/74.

Hagans, Mike et al., "Part–68 Interface," *Electronics Now*, May 1993, pp. 56–58, 71.

Black, Thomas E., "Build A Telephone Line Simulator," *Popular Electronics*, Jan. 1995, pp. 31–39, 90.

*Primary Examiner*—Krista M. Zele
*Assistant Examiner*—Scott L. Weaver
*Attorney, Agent, or Firm*—Laurence S. Rogers; Fish & Neave

[57] ABSTRACT

A controller circuit enables remote control of conventional answering machines from any telephone coupled to the same telephone line to which the answering machine is coupled, and within the same dwelling (such a telephone herein sometimes called a "local remote-control" telephone). The controller in a first mode of operation is transparent to the answering machine and to the normal operation of the local remote-control telephone. When activated by a DTMF security code transmitted from the local remote-control telephone, the controller enters a second (local remote-control) mode of operation which causes the answering machine to pick up the line as if answering a call. DTMF signals transmitted by the local remote-control telephone are coupled by the controller to the answering machine for enabling remote control operation of the machine (e.g., to retrieve recorded messages). The controller prevents supervisory tones and audio messages from a Central Office, while the local remote-control telephone is off-hook retrieving messages from the answering machine, from interfering with the retrieved messages being heard through the local remote-control telephone. A version of the controller may be embodied within an improved telephone answering machine to provide local remote-control capabilities.

28 Claims, 10 Drawing Sheets

REMOTE-CONTROL TELEPHONE ANSWERING SYSTEM AND METHOD

RELATED APPLICATION

This patent application is a continuation-in-part of commonly-owned patent application Ser. No. 08/342,093, entitled "Remote-Control Telephone Answering System and Method," filed Nov. 18, 1994 now U.S. Pat. No. 5,579,377.

This invention relates to an improvement for a telephone answering machine. More particularly, the invention relates to methods and apparatus for enabling a telephone answering machine to be coupled to a telephone line at substantially any location within a dwelling (residence or office), and to be accessed from and controlled by a conventional telephone coupled to the same telephone line at a remote location within the dwelling.

BACKGROUND

Telephone answering machines are well known. A typical consumer telephone answering machine is a stand-alone device coupled to a telephone line at a single location, and in parallel with one or more telephones coupled to the telephone line at the same or other locations. This type of answering machine typically includes circuitry for (1) detecting a ringing signal on the telephone line indicating the presence of an incoming telephone call, (2) answering the call by taking the line off-hook, (3) playing an outgoing or "greeting" message, (4) recording an incoming message, and (5) hanging up the line (going back on-hook) in order to respond to a subsequent telephone call. The greeting and incoming recorded messages typically are recorded in the analog domain using one or more conventional audio tapes. Answering machines of this type also are known in which either or both of the greeting and incoming messages are recorded instead in the digital domain using RAM or other storage device.

In addition to the foregoing, stand-alone answering machines commonly include circuitry for enabling remote-control operation of various ones of the machine's functions (e.g., playback of recorded messages, fast forwarding and rewinding of recorded messages, recording a new greeting message, and so forth). Such remote-control operation typically relies on the use of a conventional dual-tone multi-frequency (Touchtone®, or "DTMF") telephone (or DTMF-tone generating device) remotely located off of the premises at which the answering machine is located. Typically, such remote-controlled answering machines include circuitry for detecting DTMF signals generated by or from the remote telephone, and circuitry for responsively controlling the answering machine's operations. To guard against unauthorized access to recorded messages, a remote user typically must first transmit to the answering machine a sequence of DTMF signals, indicative of a predetermined security code, before the machine will respond to remotely generated DTMF command signals. An example of such a stand-alone, remote-controlled answering machine is the model TAM-50, available from Sony Corporation. There are many other examples of similar answering machines on the market.

Other types of answering machines, called "voice mail" systems, are also well known. Voice mail systems serve a plurality of users each having his or her own individually controlled and accessible "voice mailbox." Each voice mailbox may be accessed from substantially any other remotely located telephone, either within or without the dwelling. Because of their ability to service multiple users, voice mail systems are found typically in offices and other commercial environments to provide a centralized telephone answering and messaging function. While once very expensive and thus found only in commercial settings, voice mail systems today may be found small office or even residential environments having an IBM or IBM-compatible personal computer ("PC"). PC-based voice-mail systems typically comprise a circuit card placed in an expansion slot of the computer that in turn is coupled to one or more telephone lines via "ports" on the card.

Even though stand-alone telephone answering machines exist that may be remotely-controlled, as described above, known machines suffer from a common problem. This problem is that remote-control operation may be achieved only by dialing into the telephone line to which the machine is coupled from another telephone coupled to another telephone line within or without the dwelling in which the answering machine is located. That is, known stand-alone telephone answering machines may not be remotely controlled by another telephone coupled to the same telephone line within the dwelling. As a result, whenever it is desired to obtain messages from the answering machine (for instance, while at home), it is necessary to go to the answering machine to play back recorded messages or otherwise control its operation using the machine's control panel. At best, this is inconvenient.

One advantage that voice-mail telephone answering machines have over stand-alone telephone answering machines, when coupled to a PBX or to a Key Telephone System, is that voice-mail messages may be retrieved by remote control from substantially any telephone within or without the dwelling in which the voice-mail machine is located. This capability exists because the PBX or Key Telephone System is placed in effective series between the dwelling's telephone lines and the public telephone network, and controls (i.e., can prevent) access to the network (also called, herein, Central Office Lines). Thus, a PBX or Key Telephone System allows dialing from one extension within a dwelling to another extension within the same dwelling (such as to the voice-mail system to retrieve recorded messages) without interference from signals sourced from the telephone network (because the extensions in use for retrieving voice-mail messages are not coupled at that time to the telephone network).

While PBX- and Key Telephone-based voice-mail systems work very well, they suffer several problems. First, such systems are expensive and thus not well-suited for residential, consumer installations. Moreover, because a PBX or Key Telephone system approach to implementing a voice-mail telephone answering function requires placing circuitry in series between the public telephone network and the telephones within the dwelling, such a system can be inconvenient or difficult to install. This is because, in a typical digital PBX or Key Telephone system, each device coupled to the PBX or Key Telephone system requires its own dedicated wiring making a "home-run" to the PBX or Key Telephone controller. As a consequence of this, only a single telephone device typically may be coupled to each extension of the system at any given time. Thus, it is not possible with a conventional digital PBX or Key Telephone system to couple a telephone answering machine and a telephone to the same extension. And, while many PBX and Key Telephone systems can accommodate analog telephone devices coupled to analog line extensions, it still is not possible with known systems to couple both a telephone and a telephone answering machine to the same analog line extension in a manner that would enable the telephone to retrieve messages from the answering machine or otherwise to remotely control the answering machine's functions. Finally, PBX and Key Telephone systems require a user either to dial a code number (e.g., "9") in order to obtain an outside line dial tone (in the case of a PBX), or otherwise manually to select an outside line (in the case of a Key Telephone system), before obtaining a dial tone in order to place a call. It is typically not possible in either system to automatically obtain an outside line, for the purpose of initiating an outgoing telephone call, simply by picking up the receiver of a telephone to take the telephone off-hook as is possible in systems that do not use a PBX or Key Telephone controller.

SUMMARY OF THE INVENTION

In view of the foregoing, it would be desirable to provide an improvement for a telephone answering machine (either stand-alone or voice-mail) that allows the machine to be coupled to a telephone line within a dwelling at substantially any location along the line, and remotely controlled (including to play back recorded messages) from another telephone that is coupled within the dwelling to the same telephone line in parallel with, but at a location remote from, the answering machine.

It would further be desirable to provide such an improvement for a telephone answering machine that allows the answering machine to be remotely controlled from another telephone coupled to the same telephone line within the same dwelling without having to place a telephone call to the machine from another telephone line.

It would still further be desirable to provide such an improvement for a telephone answering machine that allows the machine to be remotely controlled by a telephone coupled to the same telephone line at a remote location within the same dwelling, but without having to be coupled to a PBX, or to a Key Telephone System.

It would additionally be desirable to provide such an improvement for a telephone answering machine to allow the machine to be remotely controlled from another telephone coupled to the same telephone line within the dwelling, but without having to place any circuitry or other device in series between the telephone line and a public telephone network for controlling access to the network from the telephone line.

These and other objects of the present invention are provided by a novel controller for use with or incorporation within an otherwise conventional, remote-control telephone answering machine. The controller has two modes of operation. In a first mode, the controller enables the answering machine and telephones coupled to the telephone line to operate as they normally would, and as if the controller were not present. Thus, in the first mode, the answering machine monitors the telephone line for incoming telephone calls placed from another telephone line. Upon detecting the presence of a ringing signal, the answering machine takes the line "off-hook" to answer the call, optionally plays a greeting message, records an incoming message, hangs up the line, and resets itself to await another call. In this first mode of operation, the answering machine's operation also may be remotely controlled in a conventional manner by DTMF signals transmitted by the telephone placing the call from the second telephone line. This type of remote control—in which remote operation is achieved by transmitting DTMF tones from a telephone coupled to a second line calling into the answering machine—is hereinafter referred to as "remote remote-control." In addition, in this first mode of operation, a telephone coupled to the telephone line operates in a conventional fashion to obtain a dial tone, for purposes of initiating an outgoing telephone call, automatically upon lifting the telephone's handset from the telephone's cradle (or, with some telephones, by actuating a speaker phone).

In a second or "local remote-control" mode of operation, the controller enables the answering machine to be remotely controlled by DTMF tones transmitted by substantially any telephone coupled to the same telephone line to which the answering machine is coupled, and within the same dwelling (such a telephone is herein referred to as a "local remote-control" telephone). This local remote-control mode of operation is entered when circuitry within the controller detects that (1) a local remote-control telephone has gone off-hook at time when no incoming call has been or is being received, and (2) a predetermined DTMF security code sequence has been received from the local remote-control telephone. Upon this occurrence, the controller transmits a synthesized ringing signal to the answering machine to which the controller is coupled, to cause the answering machine to go off-hook to "answer" the "call." Once the machine has answered by picking up the line, it may be remotely controlled by DTMF signals transmitted from the local remote-control telephone just as if those signals were being transmitted from a remote remote-control telephone coupled to a second telephone line calling into the telephone line to which the answering machine is coupled. Thus, messages may be played back to the local remote-control telephone without having to place a telephone call to the answering machine from another telephone line. The local remote-control telephone may be placed at substantially any location along the telephone line, either remote from or adjacent to the location along the telephone line at which the answering machine is coupled (through the controller).

In order to prevent the DTMF security tones and commands used for controlling the controller and the answering machine from inadvertently causing the placement of an outgoing telephone call, the first DTMF signal sent to the answering machine (referred to herein as an "attention signal") should preferably be one which the Central Office recognizes to be invalid and incapable of placing a telephone call (such as "#" or "*"). To reduce interference from audio signals received from the Central Office (such as supervisory tones and pre-recorded messages) when the local remote-control telephone has been off-hook for a period of time without placing an outgoing telephone call, circuitry also is provided in the controller for substantially reducing or canceling the magnitude of, or eliminating entirely, such interfering signals. This circuitry is arranged, however, so as to not substantially impair or degrade the audio signals representing messages being played back by the telephone answering machine that are heard through the local remote-control telephone, or DTMF control signals transmitted to the answering machine from the local remote-control telephone. The circuitry also allows DTMF tones still to be received by the controller and the answering machine even while the aforementioned audio messages are being reduced, to permit remote control by the local remote-control telephone.

The present invention may be implemented as a stand-alone device coupled between a conventional answering machine and a telephone line, in order to enable local remote-control of machines in which no such capability previously existed. Alternatively, the invention may be implemented within an answering machine to provide the machine with integral local remote-control capabilities.

BRIEF DESCRIPTION OF THE DRAWINGS

The above-mentioned objects and features of the invention can be more clearly understood from the following detailed description considered in conjunction with the following drawings, in which the same reference numerals denote the same structural elements throughout, and in which.

DETAILED DESCRIPTION OF THE INVENTION

Figure 1:
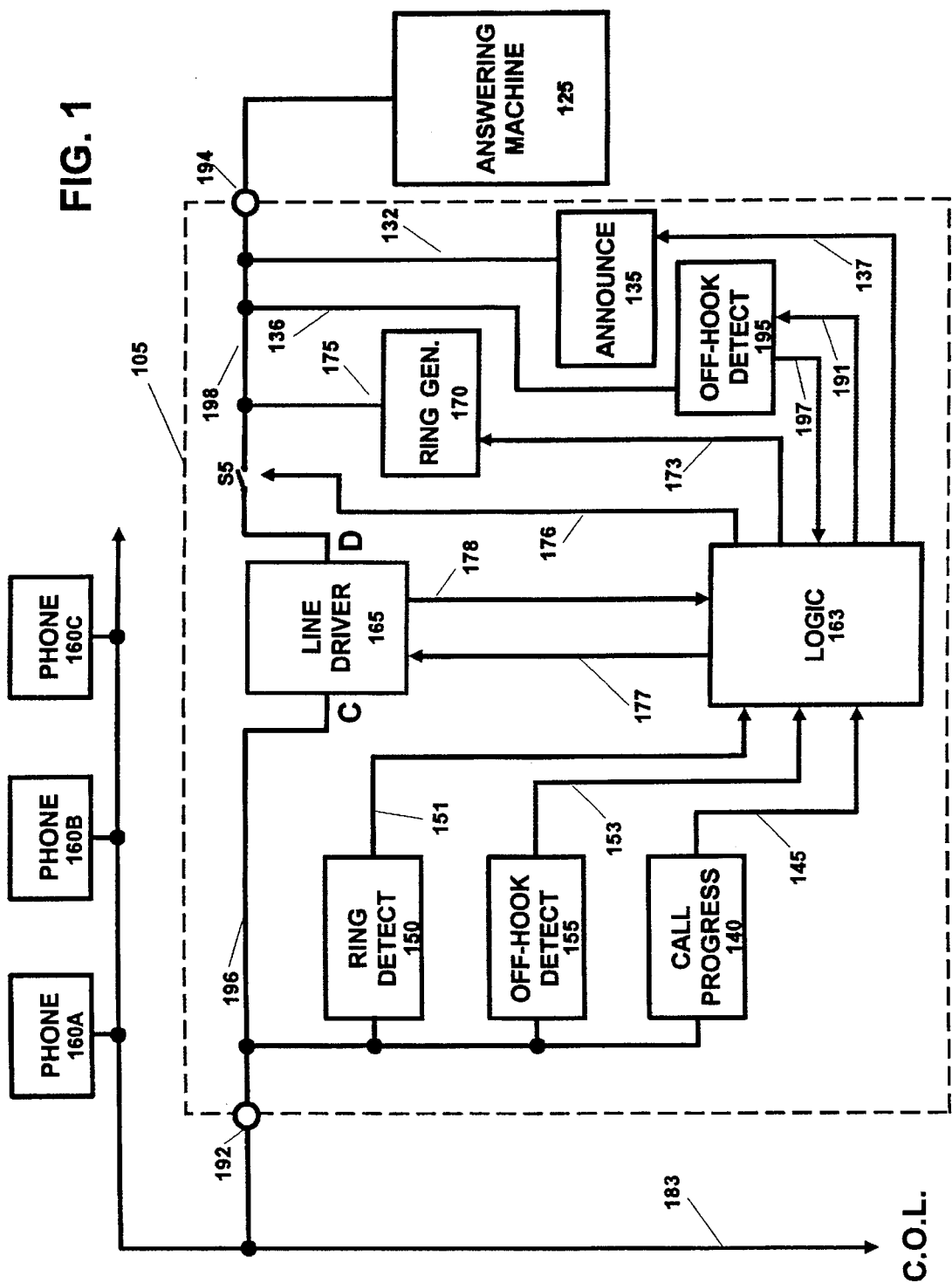
FIG. 1 is a block diagram of an exemplary embodiment of the controller of the present invention coupled between a telephone line and a conventional remote-controlled answering machine.

FIG. 1 is a block diagram of an exemplary embodiment of the invention in the context of a local remote-control adapter coupled between a telephone line and a conventional remote-controlled answering machine, to enable the answering machine to be controlled from any local remote-control telephone. As used herein, a local remote-control telephone is a telephone that is coupled to the same telephone line to which the answering machine is coupled, in parallel with the answering machine, and at a location along the telephone line that may be physically remote from the location at which the answering machine is coupled (e.g., in another part of or in a different room, or on a different floor).

As shown in FIG. 1, a conventional telephone line 183 (as might exist within any residential, commercial or other dwelling) is coupled to a Central Office via a public telephone network designated as a Central Office Line ("C.O.L.") (the telephone network is not shown in FIG. 1). Telephone line 183 is a two-wire telephone line characterized by Tip ("T") and Ring ("R") conductors (also not shown in FIG. 1). Also coupled to telephone line 183 are one or more local remote-control telephones 160A, 160B, 160C, etc., at least one of which is capable of transmitting DTMF tones (either directly, or using a DTMF generator coupled or held to the telephone). It will be appreciated by those skilled in the art that, while three telephones are shown in FIG. 1, one DTMF-capable telephone alone would be sufficient and substantially any plurality of two or more could be accommodated. Each of telephones 160A–160C may be located anywhere along telephone line 183.

Also coupled to telephone line 183 via terminal 192 (which may, for example, be a conventional RJ-11 telephone coupler), and in parallel with the local remote-control telephones, is local remote-control circuit of the present invention. Coupled to another second terminal 194 (which also may be an RJ-11 coupler) is answering machine 125. Answering machine 125 may be substantially any commercially available answering machine (stand-alone, or voice mail) that is capable of being remotely controlled by DTMF tones transmitted to it over the telephone line to which the machine is coupled. A non-limiting example of a remote-controlled answering machine suitable for use with the present invention is the aforementioned Sony model TAM-50. In this particular answering machine, remote-control operation is achieved by calling the telephone number to which the answering machine is attached from a telephone coupled to another telephone line (hereinafter called a "remote remote-control" telephone). When the answering machine picks up the line and commences playback of a greeting message, conventional DTMF signals may be transmitted to the machine from the remote remote-control telephone in the form of a predetermined answering machine security code. Upon recognizing this code, the machine enters a mode whereby remote-control operation of its various functions (e.g., recorded message playback, greeting message playback, record a new greeting, etc.) may be achieved by subsequent transmission to the answering machine of various combinations of DTMF commands.

While conventional answering machines of the foregoing type may be remotely controlled as described above, remote operation cannot be initiated from another telephone coupled to the same telephone line to which the machine is attached. That is to say, remote-control operation cannot be initiated from a local remote-control telephone. This is because placing the machine into its remote-control mode requires use of a telephone coupled to another telephone line to call the number of the telephone line to which the answering machine is attached, so that the machine picks up its line in response to the detection of a ringing signal on the line. Because of this limitation, a user within a dwelling desiring to retrieve messages from a conventional answering machine located within the same dwelling can do so in only limited ways. One way is to go physically to wherever the answering machine is located, in order to access the machine's control panel to retrieve recorded messages and otherwise to control its operations. Another way is to place a telephone call to the answering machine from a second telephone line within the dwelling, and to operate the machine remotely as if calling into the machine from outside the dwelling. Yet a third way is to use a PBX or Key Telephone System coupled to a public telephone network via one or more telephone lines to implement at least two different extensions, and to call into the answering machine coupled to one extension from another extension. None of these alternatives is fully satisfactory. The first way can be inconvenient. The second requires purchasing a second telephone number and line, and thus is expensive. In any event, the second way results in tying up both telephone lines simply to retrieve messages. The third way also requires purchase and installation of expensive equipment.

Controller 105 of the present invention solves the foregoing problems by enabling conventional answering machine 125 to be remotely controlled from any local remote-control telephone. Remote-control operation of the answering machine is achieved with the present invention using the machine's pre-existing remote-control capabilities, but without having to call into the machine from another telephone line. The invention thus allows the answering machine to be placed substantially anywhere within a dwelling, and to be readily accessed from anywhere else within the dwelling where a conventional telephone is located, using only one telephone line without a PBX or Key Telephone System.

All of this is accomplished, as shown in FIG. 1, by controller 105 coupled in series between telephone line 183 and answering machine 125. (Conventional circuitry to protect against telephone line spikes, transient, and polarity reversals and the like is not shown in the accompanying figures in order to avoid unnecessarily cluttering the disclosure.)

Controller 105 includes a first off-hook detect circuit 155 and a ring detect circuit 150 coupled to terminal 192 via line 196. Also shown coupled to terminal 192 is an optional call progress circuit 140. Off-hook detector 155 is a conventional circuit that detects when any local remote-control telephone (e.g., any of telephones 160A–160C) coupled to telephone line 183 has been taken off hook. Off-hook circuit 155 operates by detecting the DC voltage level on telephone line 183. When all telephones 160A–160C are on-hook, the DC voltage appearing across the T and R conductors of telephone line 183 is approximately 48 V. However, when any of telephones 160A–160C is taken off-hook, the DC voltage across the T and R conductors drops to about 6 V. Thus, when the voltage across telephone line 183 is low, off-hook detect circuit 150 indicates that telephone line 183 is off-hook by asserting a digital signal ("Off-Hook") on line 153. When the telephone line goes back on hook, off-hook detect circuit 155 de-asserts the Off-Hook signal. The off-hook signal is coupled, as shown in FIG. 1, to a first input of logic circuit 163 via line 153.

Ring detect circuit 150 operates to detect when a ringing signal is present on telephone line 183, to signify the presence of an incoming telephone call. Ring detect circuit 150 can be substantially any conventional circuit for accomplishing this function by detecting, in a well-known manner, the presence of a 20 Hz analog ringing signal on telephone line 183 and by responsively asserting a digital signal ("Ring") on line 151 when the ringing signal is present. The output of ring detect circuit 150 is coupled to logic circuit 163 via line 151.

Call progress circuit 140 detects, in a conventional manner, the presence on telephone line 183 of various supervisory call progress tones received from the Central Office and heard through telephones 160A–C. These call progress tones include, for example, audible dial, ringing, busy and re-order tones. When any of these call progress tones is present on the telephone line, it is detected by call progress circuit 140 which responsively asserts a digital signal indicative of the particular tone or tones detected. This signal is coupled to logic circuit 163 via line 145.

Also included within controller 105 is a ring generator 170, second off-hook detect circuit 195 and announcement circuit 135. Ring generator 170 includes an output coupled to line 198 of controller 105 via line 175, and a control input coupled to logic circuit 163 via control line 173. Ring generator operates, in a conventional manner, to synthesize and output on line 175 an analog 20 Hz ringing signal in response to a control signal received from logic circuit 163 over line 173. In order to prevent transmission of the synthesized ringing signal to telephone line 183 (which might cause one or more of telephones 160A–160C to ring as if in response to an incoming telephone call), controller 105 further includes a switch S5 coupled in series between the output of ring generator 170 and telephone line 183 (and line driver 165). Switch S5 is controlled, as described in more detail below, by a control line of logic circuit 163. Switch S5 preferably comprises a normally closed relay, although other types of switches (including solid-state transistor switches) may be used.

Second off-hook detect circuit 195, coupled to line 198, monitors the state of line 198 in order to detect, as further described below, when answering machine 125 has picked up the line by going off-hook. Off-hook detect circuit 195 is enabled by logic circuit 163 via line 191, and asserts an "Answering Machine Off-Hook" signal on line 197 coupled to an input of logic circuit 163.

Announcement circuit 135 is coupled to line 198 via output line 132, and is controlled by logic circuit 163 via control line 137. As further described below, announcement circuit 135 places various audible announcements onto line 198 for transmission to local remote-control telephones 160A–160C during operation of controller 105. Preferably, announcement circuit 135 comprises a conventional speech synthesizer circuit including a digital signal processor and memory programmed to enable the generation of various spoken messages indicative of different states of operation of controller 105. Alternatively or additionally, announcement circuit 135 may include a conventional tone generator for transmitting to telephones 160A–160C different tones indicative of different states of operation of controller 105.

Logic circuit 163 may be substantially any form of logic circuitry for controlling and synchronizing operation of the various circuits of controller 105 as described below. Logic circuit 163 may be comprised, as will readily understood by persons skilled in the art, of conventional NAND, NOR and other logic gates for synchronizing and controlling the aforementioned circuit modules and various functions described herein. Alternatively, logic circuit 163 may be comprised of a microprocessor conventionally programmed, as would be readily understood by persons skilled in the art, for carrying out the various operations to be described. However implemented, logic circuit 163 receives as inputs the Ring signal generated by ring detect circuit 150, the Off-Hook and Answering Machine Off-Hook signals asserted by circuits 155 and 195, and the call progress signals generated by call progress circuit 140. Logic circuit 163 further includes outputs for controlling ring generator circuit 170, switch S5, off-hook detect circuit 195 and announcement circuit 135, as well as inputs and outputs respectively coupled to line driver 165 via control lines 177 and data lines 178.

Line driver circuit 165 is coupled, as shown in FIG. 1, in series between telephone line 183 and answering machine 125. Line driver 165 includes two bidirectional ports C and D. As more fully discussed below, line driver 165 performs two principal functions. First, it enables any local remote-control telephone 160A–160C to remotely control the playback of recorded messages of answering machine 125 in order to retrieve those messages through that telephone. Second, line driver 165 substantially reduces supervisory tones, audio messages and other audio signals transmitted by the Central Office to telephone line 183 while recorded messages are being played back through the local remote-control telephone, in order to reduce undesirable interference between those signals and the recorded message as heard through the telephone.

The apparatus of FIG. 1 operates as follows. Assume, initially, that each of telephones 160A–160C is on-hook and a ringing signal is not present on telephone line 183. In this default state, the outputs of ring detect circuit 150, off-hook detect circuit 155 and call progress circuit 140 are de-asserted (e.g., at a logical low). In response to these signals, logic circuit 163 via control line 177 causes line driver 165 between ports C and D to be bypassed, so that audio and DTMF signals pass essentially unaltered between ports C and D (as if line driver 165 were not present). In this default state, ring generator 170 is disabled and switch S5 is closed by control signals output by logic circuit 163.

With controller 105 in the default state as described above, if a telephone call is placed to telephone line 183 from another telephone line, a 20 Hz, high-voltage ringing signal transmitted from the Central Office will appear on telephone line 183. This ringing signal is detected by ring detect circuit 150, which asserts a logical "1" (Ring signal) to logic circuit 163 via line 151. The assertion of the Ring signal causes logic circuit 163 to maintain controller 105 in its default state in which: (1) answering machine 125 is coupled to telephone line 183 transparently through line driver 165, (2) ring generator 170 is maintained off, and (3) switch S5 is closed. If one of telephones 160A-160C is picked up to answer the call, or if answering machine 125 answers the call, off-hook detect circuit 155 detects that telephone line 183 has gone off-hook and asserts an Off-Hook signal to logic circuit 163 via line 153. Logic circuit 163 interprets the presence of the Off-Hook signal on line 153 concurrently with the presence of the Ring signal on line 151, or within a predetermined period of time (e.g., two seconds) after the cessation of the Ring signal on line 151, as an indication that an incoming telephone call was answered. Alternatively, logic circuit 163 determines that an incoming call was answered if the Off-Hook signal is asserted without the assertion within a predetermined period of time (e.g., one second) of a Dial Tone signal generated by call progress circuit 140 on line 145. Upon determining that an incoming call has been answered, logic circuit 163 continues to maintain line driver 165 in its default (bypassed) state, ring generator 170 off, and switch S5 closed.

When telephone line 183 goes back on-hook (as would occur when each of telephones 160A-160C is returned to its on-hook state following a telephone call, or when answering machine 125 hangs up the line in the event it answered the call), this is detected by off-hook circuit 155 and signaled to logic circuit 163 by the de-assertion of the Off-Hook signal on line 153. Logic circuit 163 continues to maintain switch S5 closed, and ring generator 170 off.

As thus far described, telephone line 183, telephones 160A-160C and answering machine 125 operate normally, and as if controller 105 were not there. Thus, in the default state of operation above-described, if DTMF tones appear on telephone line 183 (such as would occur if a remote remote-control telephone calling into telephone line 183 operated answering machine 125 by conventional remote control), these signals are ignored by controller 105.

In accordance with the present invention, controller 105 may enter a second (local remote-control) mode of operation in which any DTMF-capable local remote-control telephone 160A, 160B or 160C may remotely control answering machine 125 to retrieve recorded messages. In the preferred embodiment of FIG. 1, this second mode of operation is entered when: (a) any of telephones 160A-160C goes off-hook at a time when a ringing signal is not present on telephone line 183 (or, if optional call progress circuit 140 is used, when a dial tone is detected), and (b) a predetermined DTMF local remote-control security code (such as, for example, ###) is transmitted from the local remote-control telephone to controller 105 within a predetermined time period of the line going off-hook (as a security feature). When these events occur, the following signals are coupled to logic circuit 163: (1) the Ring signal output by ring detect circuit 150 is de-asserted (a logical "0"); (2) call progress circuit 140, if used, asserts a Dial Tone signal; (3) off-hook circuit 155 asserts the Off-Hook signal on line 153; and (4) line driver 165 outputs on line 178 data signals indicative of the DTMF security code transmitted by the local remote-control telephone. Upon receiving these inputs, and confirming that the proper security code has been received (within, e.g., five seconds of the line going off-hook), logic circuit 163 places controller 105 in its local remote-control mode, described below. Of course, if any of local remote-control telephones is taken off-hook and is used to initiate an outgoing telephone call, logic circuit 163 will maintain controller 105 in its default state (because no security code within the predetermined time period, and no dial tone, will be detected).

Upon entering local remote-control mode, logic circuit 163 opens switch S5, and then enables ring generator 170 to couple a synthesized analog ringing signal to line 198. (Additionally, logic circuit 163 enables optional announcement circuit 135 to transmit to the local remote-control telephone a message or audio signal—e.g., two distinctive beeps—indicating that controller 105 has entered its local remote-control mode.) The synthesized ringing signal is blocked by opened switch S5 from being coupled telephone line 183, but it is coupled to answering machine 125 via line 198 and terminal 194. The synthesized ringing signal causes answering machine 125 to "answer" the call by taking line 198 off-hook. This, in turn, is detected by answering machine off-hook detect circuit 195, which also was enabled by logic circuit 163 via control line 191 when switch S5 was opened via control line 176. Answering machine off-hook detect circuit 195 asserts an answering machine off-hook signal to logic circuit 163 via line 197.

Answering machine off-hook detect circuit 195 operates by impressing on telephone line 198, when switch S5 is opened, DC voltages corresponding to the different on-hook and off-hook voltages appearing on telephone line 183. Thus, when switch S5 is opened and before line 198 is picked up by answering machine 125, off-hook detect circuit 195 impresses 48 V D.C. on line 198 to indicate to answering machine 125 that line 198 is on-hook. When answering machine 125 detects a ringing signal on line 198 (from ring generator 170), and picks up line 198, off-hook detect circuit detects this and causes the voltage on line 198 to drop to 6 V DC indicative of the line being taken off-hook. By coupling these voltages onto line 198 corresponding to those appearing on telephone line 183, off-hook detect circuit 195 ensures that substantially any commercially available answering machine 125 will work properly with controller 105.

Upon receipt of the answering machine off-hook signal from circuit 195, logic circuit 163 turns off ring generator 170 and closes switch S5. In the event that answering machine 125 for whatever reason does not pick up line 198, logic circuit 163 after a predetermined number of rings disables ring generator 170, disables off-hook detect circuit 195, closes switch S5, and resets.

Also upon receipt of the answering machine off-hook signal, logic circuit 163 via control lines 177 enables line driver 165 between ports C and D. When enabled, line driver 165 couples message signals being played by answering machine 125 to telephone line 183 (from port D to port C), so that these messages may be heard through any of the local remote-control telephones 160A–160C. In addition, line driver 165 couples DTMF control signals transmitted by the local remote-control telephone to answering machine 125 (from port C to port D), in order to enable the machine's various operations to be remotely controlled. Thus, the user of the local remote-control telephone may transmit to the answering machine whatever security code or codes may be necessary to place the machine into a state by which it may be remotely controlled, and thereafter transmit whatever other DTMF command signals may be necessary in order to cause the answering machine to play back its recorded messages or otherwise to perform various desired ones of its remote-control functions. Line driver 165 accomplishes all of this while at the same time reducing undesirable interference with messages being played back in the local remote-control telephone caused by audio signals transmitted onto line 183 from the Central Office switched telephone network.

In the preferred embodiment, line drive 165 reduces this interference by substantially reducing the magnitude of supervisory tones, messages and other undesirable audio signals that appear on telephone line 183 as a result of transmissions from the Central Office. This is done, however, without substantially affecting the magnitude of message signals being transmitted onto telephone line 183 from answering machine 125. By reducing the Central Office signals, line driver 165 reduces interference that these signals cause with messages being played back by the answering machine and heard through the local remote-control telephone. Line driver 165 thus reduces Central Office interference without requiring circuitry to be coupled in series between the public telephone network and the telephone line to which the answering machine and local remote-control telephones are coupled.

After recorded messages have been retrieved from the answering machine, the local remote-control telephone will be hung up by the user. This is detected by off-hook detect circuit 155, which responsively de-asserts the off-hook signal on line 153. This, in turn, is detected by logic circuit 163 which responsively resets line driver 165 to its default (bypassed) state as above-described. In addition, logic circuit 163 opens switch S5 temporarily to de-couple answering machine 125 from the telephone line when the local remote-control telephone is hung up. This is done to ensure that telephone line 183 is immediately ready for the placing of an outgoing telephone call, which would not be the case if answering machine in accordance with its particular mode of operation had not yet hung up the line. When answering machine 125 re-enters its default state in accordance with its particular mode of operation (depending on the make and model of answering machine used), this will be detected by answering machine off-hook circuit 195. Logic circuit 163 then will close switch S5 and disable off-hook detect circuit 195 so that answering machine 125 is again able to pick up telephone line 183 either in response to an incoming telephone call from the telephone network, or in response to a local remote-control telephone initiating remote-control operation of the answering machine.

Figure 2:
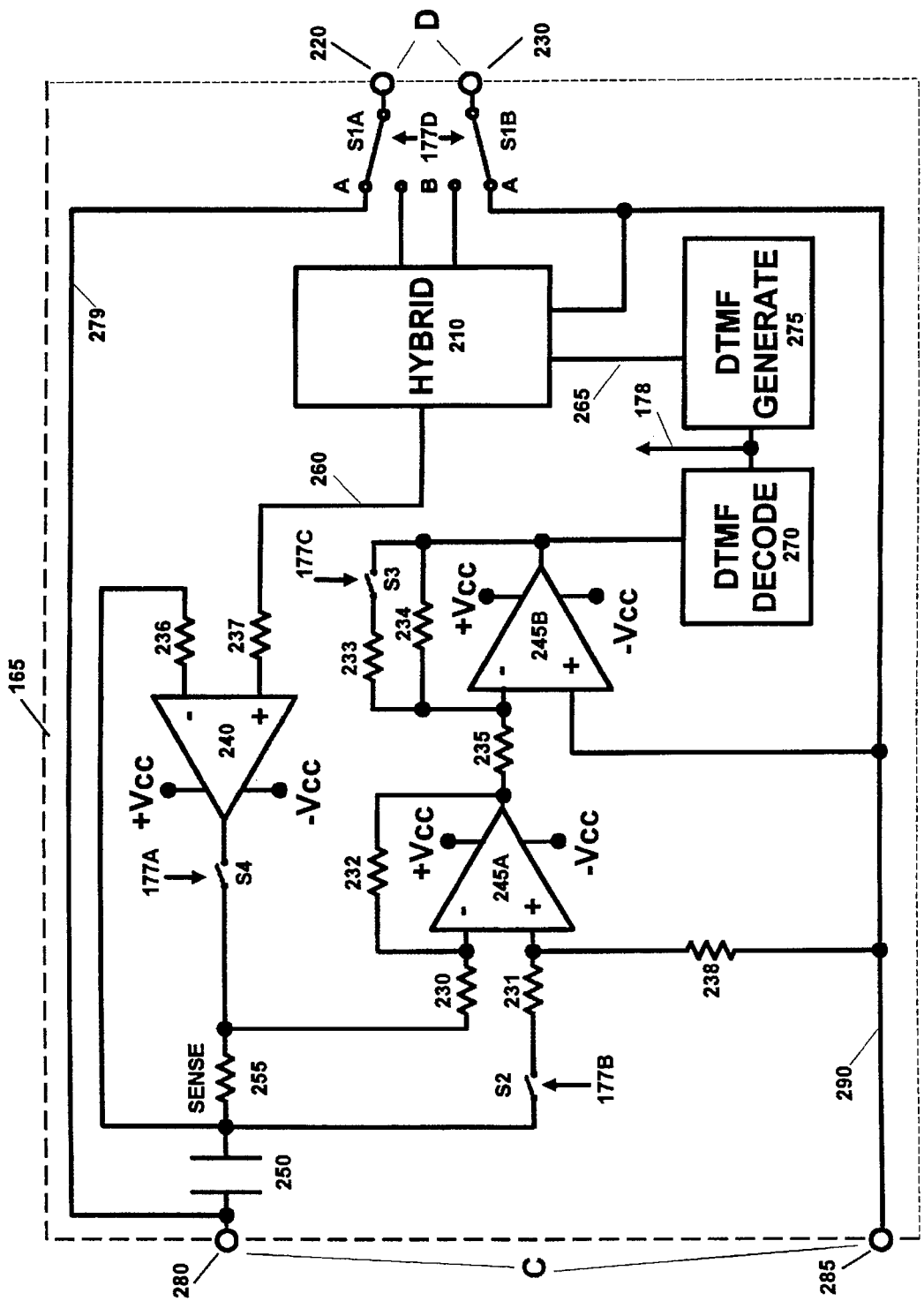
FIG. 2 is a simplified circuit diagram of an exemplary embodiment of the line driver illustrated in FIG. 1.

The operation of the apparatus of FIG. 1, as described above, can be further appreciated from FIG. 2, which illustrates an exemplary embodiment of line driver 165. As shown in FIG. 2, line driver 165 includes a pair of terminals 280 and 285 which together comprise port C (see FIG. 1). These terminals are coupled, as shown in FIG. 1, to terminal 192 via line 196 (comprising a pair of conductors), and then to the T and R conductors of telephone line 183. Coupled to terminal 280 is a first terminal of capacitor 250, the purpose of which is to block DC current sourced from telephone line 183. Coupled to the other terminal of capacitor 250 is a first terminal of sense resistor 255. The other terminal of resistor 255 is coupled to a first terminal of a normally open switch S4. Switch S4 preferably comprises a normally open relay actuated by a control signal 177A coupled to the relay's coil. Signal 177A is one of several control signals, generally denoted as 177 in FIG. 1, that are generated and coupled to line driver 165 by logic circuit 163. The other control signals, also shown in FIG. 2, are signals 177B, 177C and 177D. These respectively actuate switches S1 (comprised of double-throw switches S1A and S1B), S2 (normally open) and S3 (normally closed). While relays are preferred for switches S1–S4, it will be appreciated by persons skilled in the art that other types of switches, such as bipolar or MOS transistor switches, may be used.

The second terminal of switch S4 is coupled to the output of amplifier 240. This amplifier is powered, as shown, from a conventional positive and negative supply designated as $+V_{cc}$ and $-V_{cc}$. The negative input of differential amplifier 240 is coupled through resistor 236 to the node between resistor 255 and capacitor 250, such that resistor 255 is within the amplifier's feedback loop. The other (positive) input of amplifier 240 is coupled through resistor 237 to a primary terminal of hybrid transformer 210.

Also coupled to the first terminal of capacitor 250 (at terminal 280) is a terminal (A) of switch S1A. A second terminal (B) of switch S1A is coupled to one of the secondary terminals of hybrid 210, and a third terminal of switch S1A is coupled to first terminal 220 of port D of line driver 165. A second terminal 230 of port D is coupled to a terminal of switch S1B. Switch S1B also includes a second terminal (A) coupled to terminal 285 of port C and to another primary terminal of hybrid 210, and a third terminal (B) coupled to the other one of the secondary terminals of hybrid 210. As discussed further below, the two portions of switch S1 operate in tandem so that terminals 220 and 230 of port D are coupled either to terminals 280 and 285 of port D via terminals A of switches S1A and S1B (as shown in FIG. 2), or to the secondary of hybrid 210 via terminals B of the switches.

Amplifier 240 preferably is of a type capable of driving a significant current. While many commercially available differential amplifiers may be used for amplifier 240, preferably the amplifier comprises an LT1007 Low Noise, High Speed Precision Operational Amplifier in combination with an LT1010 Power Buffer, both available from Linear Technology Corporation of Milpitas, Calif. The LT1010 buffer increases the output capability of the LT1007 device. Persons skilled in the art will recognize that an amplifier providing more or less drive current may instead be used depending on the characteristics of the telephone line to which the line driver is coupled.

Coupled across sense resistor 255, through switch S2 and resistors 230 and 231, are the negative and positive inputs of a second amplifier 245A. This amplifier, also powered from the $+V_{cc}/-V_{cc}$ supply, preferably is an LT1007 operational amplifier. When switch S2 is closed, amplifier 245A couples the signal generated across sense resistor 255 to amplifier 245B. Resistors 230 and 231, as well as feedback resistor 232 and resistor 238, preferably are of equal value (in the range of 25k–50k ohms) so that amplifier 245A rejects common mode signals and has an overall gain of 1. Amplifier 245B, also preferably a Linear Technology LT1007 operational amplifier, is configured with resistors 233, 234, 235 and switch S3 to have an adjustable gain determined by the values of these resistors and the state (opened or closed) of switch S3. The particular values of the resistors 230–235 preferably are determined empirically in view of the considerations discussed below, and the particular other components used in line driver 165, in order to optimize performance of the circuit in a given application.

The output of amplifier 245B is coupled to the input of DTMF decode circuit 270. DTMF decode circuit 270 is a commercially available integrated circuit of the type that receives an analog DTMF signal, and outputs a 4-bit binary signal representative of the received DTMF tones. A non-limiting example of a DTMF circuit suitable for use with the invention is the CD22204 5 V Low Power Subscriber DTMF Receiver, available from Harris Semiconductor of Melbourne, Fla.

The 4-bit output of DTMF decode circuit 270 is coupled to the input of DTMF generator circuit 275, as well as to logic circuit 163 via data lines 178. DTMF generator circuit 275 is a commercially available integrated circuit that takes as its input 4 binary data bits indicative of a desired DTMF encoding, and outputs corresponding analog DTMF tones on line 265 (an example of such a circuit is the CD22859 Dual-Tone Multifrequency Tone Generator, available from Harris Semiconductor). The combination of DTMF decode circuit and DTMF generator circuit results in a DTMF signal being output on line 265 corresponding to the DTMF tones received by line driver 165 from telephone line 183. The DTMF output from DTMF generator 275 is coupled via line 265 to a third primary terminal of hybrid transformer 210.

Line driver 165 operates as follows. When controller 105 is in its default mode of operation, as previously described, logic circuit 163 causes switches S1A and S1B to be coupled to position (A), switch S3 to be closed, and switches S2 and S4 to be open. This setting of switches S1 through S4 causes amplifier block 240 of line driver 165 to be disabled and bypassed. Signals thus pass bi-directionally between ports C and D via lines 279 and 290. Amplifiers 245A and 245B, however, continue to be enabled for amplifying signals appearing across port C. This occurs because the negative input of amplifier 245A is coupled to terminal 280 through resistor 230, resistor 255 and capacitor 250, and the amplifier's positive input is coupled to terminal 285 through resistor 238.

When one of local remote-control telephones 160A–160C goes off-hook without the presence of a ringing signal on telephone line 183, as previously described, logic circuit 163 via control lines 177 maintains switches S1–S4 in the above-described states. Thus, line driver 165 continues to detect DTMF commands transmitted by any of telephones 160A–160C. This is because DTMF signals appearing on telephone line 183 are coupled to amplifier 245A, and then to amplifier 245B. These signals are amplified by amplifier 245B, coupled to DTMF decode circuit 270, and then output in binary form to logic circuit 163.

If a sequence of DTMF signals corresponding to a predetermined local remote-control security code is received, as determined by logic circuit 163, the logic circuit places controller 105 into its local remote-control mode of operation. As previously described, this results in the generation of a synthesized ringing signal to answering machine 125.

When off-hook detect circuit 195 signals that answering machine 125 has picked up line 198 in response to the synthesized ringing signal, logic circuit 163 opens switch S3 via control line 177C, closes switches S2 and S4 via control lines 177B and 177A, respectively, and actuates switch S1 to couple port D to the secondary of hybrid 210 (position B).

This setting of switches S1–S4 fully enables line driver 165. With the closing of switch S4 and the actuation of switch S1 into position B, audio signals generated by answering machine 125 are transmitted by amplifier 240 of line driver 165 to telephone line 183. Thus, messages recorded by answering machine 125 may now be transmitted to and heard through any of local remote-control telephones 160A–160C. Simultaneously, amplifier 240 via the feedback path formed from the node between capacitor 250 and resistor 236 the amplifier's negative input, forces the AC impedance at the node between capacitor 250 and sense resistor 255—and, hence, of telephone line 183—to be at or close to zero. As a consequence of this, while audio message signals transmitted from answering machine 125 to telephone line 183 may be heard through any of local remote-control telephones 160A–160C, supervisory tones, messages and other audio signals transmitted to telephone line 183 from the Central Office telephone network will be substantially reduced in volume. This reduction substantially reduces interference that would otherwise be caused by these Central Office tones and signals, and that would be heard through local remote-control telephones 160A–160C while the answering machine's recorded messages are being played.

Switch S2 and sense resistor 255 are present in the circuit to ensure that answering machine 125 can be controlled by DTMF signals transmitted by local remote-control telephone 160 even while amplifier 240 is decreasing the magnitude on telephone line 183 of analog signals transmitted from sources other than answering machine 125. Because sense resistor 255 is located within the feedback loop of amplifier 240, AC signals transmitted onto telephone line 183 (e.g., from telephones 160A–160C or the Central Office) will appear across resistor 255 even though these signals are highly attenuated between terminals 280 and 285. With switch S2 closed, amplifier 245A couples these signals appearing across resistor 255 to amplifier 245B, rather than the attenuated signals appearing across terminals 280 and 285. As a result, even while the AC impedance of telephone line 183 is being forced to be at or close to zero, causing a reduction in the amplitude of AC signals transmitted onto telephone line 183, DTMF signals transmitted by telephones 160A–160C will appear across resistor 255, will be amplified by amplifiers 245A and 245B, and will be coupled to DTMF decode circuit 270. These DTMF signals thus may be used to control controller 105, and answering machine 125, even while signals are being attenuated on telephone line 183 by amplifier 240. The binary output of DTMF decode circuit 270 is coupled to DTMF generator circuit 275, which re-creates received DTMF tones on line 265 for coupling to answering machine through hybrid 210. Switch S3 is present in the circuit in order to adjust the gain of the amplifier block 245A/245B, and more particularly to increase the gain of the block when DTMF signals are being sensed across resistor 255 and to decrease the block's gain when DTMF signals are being sensed across terminals 280 and 285.

The purpose of decoding and then generating received DTMF signals, using DTMF decoder 270 cascaded with DTMF generator 275, is to avoid coupling to hybrid 210 signals other than DTMF signals that might appear across sense resistor 255 (such as signals transmitted from the Central Office). The concern is to prevent non-DTMF signals output by amplifier 245B from being turned around by hybrid 210, and transmitted back onto the telephone line to interfere with messages being played back by answering machine 125. The combination of DTMF decode circuit 270 and DTMF generator circuit 275 ensures that this cannot happen. There are, of course, other ways of preventing such interference. For instance, persons skilled in the art will appreciate that the DTMF output of amplifier 245B could be directly coupled to hybrid 210, rather than through DTMF decoder 270 and DTMF generator 275, by appropriate selection of hybrid 210. In such a case, hybrid 210 would be constructed to prevent substantial transmission onto line 260 of signals coupled to hybrid 210 from line 265.

The result of all of the foregoing is that controller 105 allows messages to be retrieved from answering machine 125 using any local remote-control telephone that is coupled to the same telephone line to which the answering machine is coupled, and in parallel with the answering machine. Moreover, these messages may be retrieved without undesirable audio interference caused by other signals (such as supervisory tones and audio messages) that might be transmitted to the telephone line by the Central Office. Additional circuitry to block such interfering signals, placed in series between the telephone network and the telephone line to which the local remote-control telephone or answering machine are coupled, is not required.

Figure 2A:
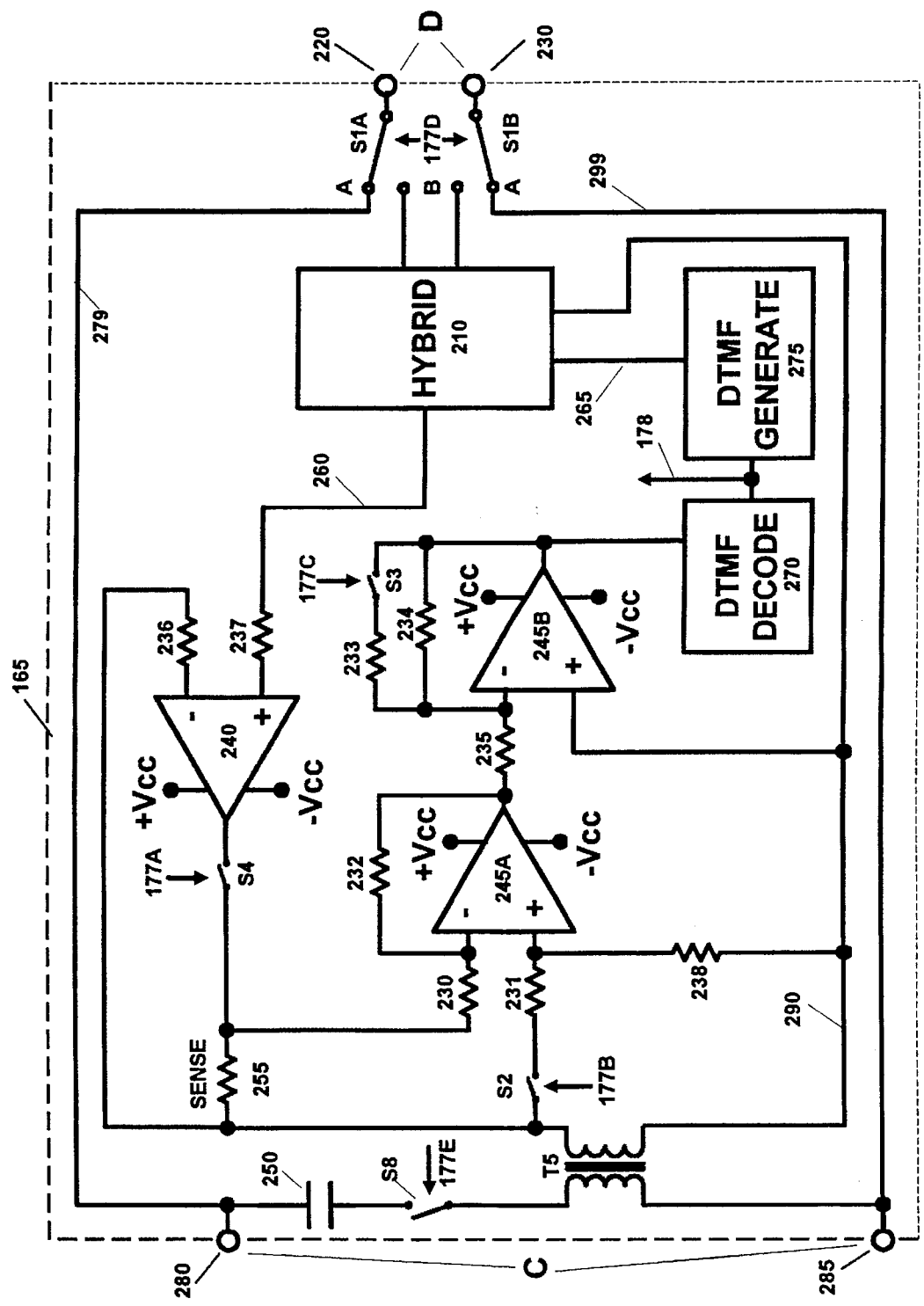
FIG. 2A is an alternative circuit diagram of the exemplary embodiment of the line driver of FIG. 2.

FIG. 2A shows an alternative implementation of the circuit of FIG. 2. In FIG. 2A, the circuitry of FIG. 2 has been modified by the addition of an FCC Part 68 telephone line coupling transformer T5, and a switch S8 (which may be a relay) actuated by a control signal produced by Logic circuit 163 and coupled to the switch via control line 177E. For best performance, transformer T5 should be chosen to have a very low DC coil resistance (preferably a few ohms or less) in order minimally to degrade the performance of the Line Driver in reducing the amplitude of undesired audio signals transmitted from the Central Office as before described. Switch S8 is normally open when controller 105 is in its default state of operation and telephones 160A–C are on hook, to de-couple the circuitry of Line Driver 165 from telephone line 183. If any of telephones 160A–C go off-hook other than in response to an incoming telephone call (as determined by Logic circuit 163 when Off-Hook Detect circuit 140 signals that line 183 has gone off-hook without ringing signals having been received from Ring Detect circuit 150), Logic circuit 163 closes switch S8. The closing of switch S8 AC-couples the circuitry of Line Driver 165 (which is still in its default mode of operation, as already described with respect to FIG. 2) to telephone line 183, thus enabling Line Driver 165 to respond to DTMF commands sent from any of telephones 160A–C to enable controller 105 to be placed into its second (local remote-control) mode of operation as heretofore described with respect to FIG. 2. It will be appreciated from inspection of FIG. 2A that even when switch S8 is open, an answering machine 125 coupled to port D of the Line Driver 165 of FIG. 2A is still capable of responding to telephone calls in order to record incoming messages (or to play back recorded messages to a remote remote-control telephone).

Figure 3:
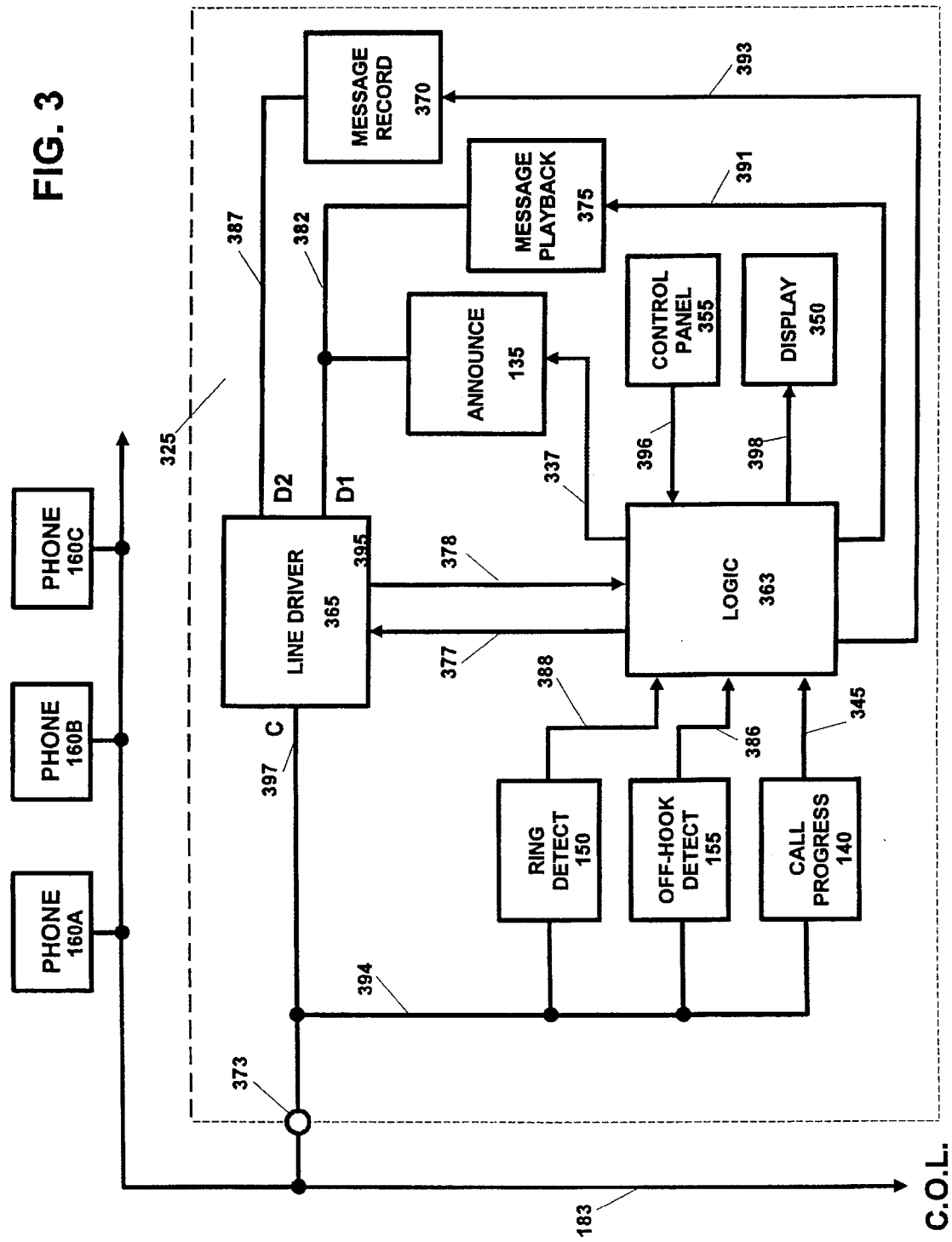
FIG. 3 is a block diagram of an alternative embodiment of the present invention placed integrally within an improved telephone answering machine.

Turning now to FIG. 3, an alternative embodiment of the invention is shown in which local remote-control circuitry has been embodied integrally within an answering machine 325. Answering machine 325 is coupled to telephone line 183 via RJ-11 terminal 373 such that it is in parallel with local remote-control telephones 160A–160C. Telephone line 183, in turn, is coupled to a Central Office ("C.O.L.") via a telephone network (not shown) as in FIG. 1. Answering machine 325 includes conventional circuitry for recording (message record block 370) and playing back (message playback block 375) incoming and greeting messages. Also included within answering machine 325 is a microprocessor 363 (which, alternatively, could be hard-wired logic) for controlling and synchronizing the answering machine's operations. Answering machine 325 further includes a ring detect circuit 150 for detecting the presence of a ringing signal indicative of an incoming telephone call, an off-hook detect circuit 155 for detecting when telephone line 183 has gone off-hook, a display 350 (which includes, for example, a received message counter and various indicator lights for informing the user of the status of the answering machine), a control panel 355 (which includes, for example, pushbuttons for operating the answering machine's various functions such as record a greeting message, play back recorded messages, set date and time for purposes of time-stamping recorded messages, fast-forward, rewind and stop), and line driver 365 (having three ports C, D1 and D2). Also optionally included within answering machine 325 is call progress circuit 140 for detecting different call progress tones appearing on telephone line 183, and an announcement circuit 135.

In its default state of operation, answering machine 325 appears to a user to operate in a manner similar to a conventional answering machine. Thus, if local remote telephones 160A–160C are on-hook and a ringing signal appears on line 183 indicative of an incoming telephone call from another telephone line, this ringing signal will be detected by ring detector 150 which will responsively output a ring signal to microprocessor 363 via line 388. After a predetermined number of rings (typically, but not necessarily, one ring), microprocessor 363 will cause answering machine 325 to "answer" the call by a control signal coupled to line driver 365 via control lines 377, as more particularly discussed below with respect to FIG. 4. When answering machine 325 picks up the line in response to the ringing signal, microprocessor 363 via line 391 optionally commands the playback of a greeting message. In its default state of operation, line driver 365 is disabled via control signals coupled from microprocessor 363 via control lines 377. The greeting message, therefore, passes through line driver 365 to telephone line 183 (between ports D1 and C), and is coupled to telephone line 183 for transmission to the telephone being used by the caller. Following playback of the greeting message, microprocessor 363 commands message record circuit 370 (by a control signal coupled over line 393) to record the caller's message. The message passes through line driver 365 from port C to port D2, and to message record circuit 370 over line 387. After the message has been recorded, microprocessor 363 causes answering machine 325 to hang up the line by control signals sent to line driver 365 over control lines 377.

In the above-described situation, the caller also can operate answering machine 325 by remote control using DTMF signals transmitted from his or her remote remote-control telephone (not shown). DTMF signals are coupled to line driver 365, where they are detected by a DTMF decode circuit (discussed below in the context of FIG. 4). Binary signals indicative of received DTMF signals are coupled to microprocessor 363 via data lines 378. Responsive to the receipt of a predetermined security code followed by predetermined remote-control commands signals, microprocessor 363 controls the operation of the various circuits 370 and 375 of answering machine 325 in a conventional manner to play back recorded messages to the caller, to record a new greeting message, and so forth. Additionally, optional announcement circuit 135 is actuated via control line 337 to generate an announcement to the remote remote-control telephone (e.g., stating the number of messages available to be retrieved).

Answering machine 325 of FIG. 3 is also capable of being placed in a second (local remote-control) mode of operation so that its various operations can be controlled by DTMF signals transmitted from any of local remote-control telephones 160A–160C. This second mode of operation is entered when any of telephones 160A–160C: (1) goes off-hook at a time when no ringing is (or recently has been) present on telephone line 183 (or if call progress circuit 140 fails to detect within a predetermined period of time the presence of a dial tone), and (2) transmits a predetermined DTMF security code to answering machine 325 within a predetermined period of time after the local remote control telephone has gone off-hook. When these events occur, line driver 365 is enabled to couple the answering machine to telephone line 183 while reducing the magnitude of undesirable audio signals transmitted from the Central Office in order to reduce interference between these signals and the answering machine messages being played back through the local remote-control telephone. Remote-control DTMF signals transmitted from any of local remote-control telephones 160A–160C are detected by line driver 365 and are coupled, in binary form, to microprocessor 363 to effect remote operation of the answering machine. Using these remote-control signals, any of local remote-control telephones 160A–160C may retrieve messages that have been recorded by the answering machine. The other functions of answering machine 325 may be remotely controlled as well. The user of a local remote-control telephone thus may change the greeting message, record his or her own message for another member of the household, etc. When local remote-control telephone 160 is hung up, this is detected by off-hook detect circuit 155. In response, microprocessor 363 resets line driver 365 so that answering machine 325 is ready to answer a telephone call and record a message from a remote remote-control telephone.

Figure 4:
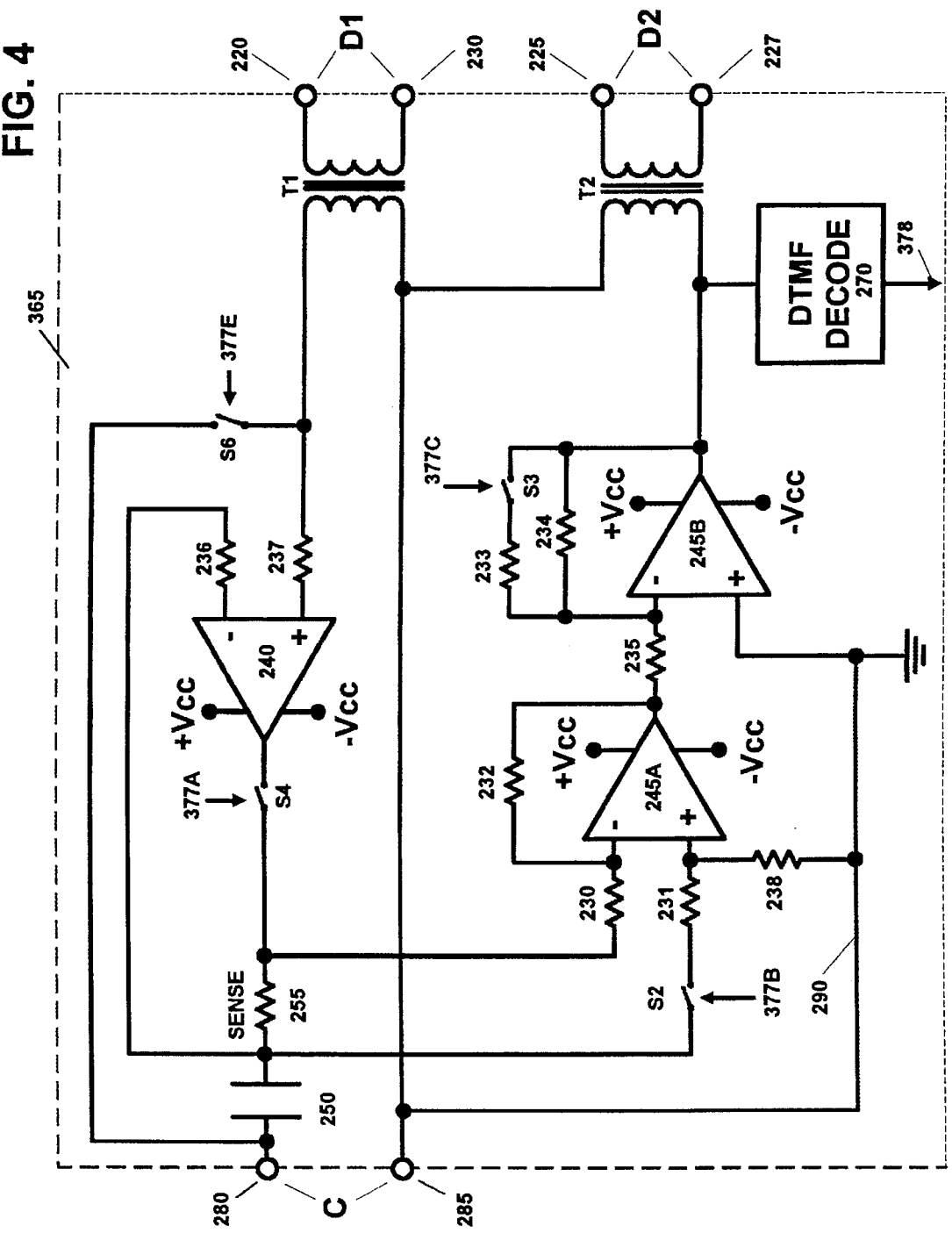
FIG. 4 is a simplified circuit diagram of an exemplary embodiment of the line driver illustrated in FIG. 3.

The operation of answering machine 325, as described above, may be further understood from considering the circuitry of line driver 365, which is shown in greater detail in FIG. 4. Line driver 365 is similar to line driver 165 of FIG. 2, except that (1) DTMF generator circuit 275 has been deleted, (2) hybrid 210 has been replaced by transformers T1 and T2 coupled, respectively, to ports D1 (terminals 220 and 230) and D2 (terminals 225 and 227), and (3) switch S1 has been deleted and switch S6 has been added.

In the default mode of operation of answering machine 325, microprocessor 363 causes switch S3 to be closed (to decrease the overall gain of amplifier 245B), and switches S2, S4 and S6 to be open. With switch S4 open, amplifier 240 is disabled from coupling signals to port C or from reducing the AC impedance of telephone line 183. With switch S6 open, answering machine 325 is on-hook.

With answering machine 325 in the foregoing state, a ringing signal will be detected by ring detect circuit 150 (FIG. 3) if a telephone call is placed to telephone line 183 from a remote remote-control telephone. In response to this, microprocessor 363 via control line 377E closes switch S6. The closing of switch S6 allows a DC current sourced by the Central Office to flow through the primary of transformer T1, which in turn causes answering machine 365 to be recognized at the Central Office as having gone off-hook. Microprocessor 363 then controls the operation of answering machine 365 in a conventional manner, as discussed above, optionally to play a greeting message. Audio signals representative of the greeting message pass through line driver 365 from port D1 to port C (through switch S6), and from there to telephone line 283. Audio signals representing messages to be recorded by the answering machine that are transmitted from the remote remote-control telephone enter line driver 365 through port C. These signals appearing across terminals 280 and 285 of port C are coupled to amplifier 245A (because switch S2 is open), are output from amplifier 245A to amplifier 245B where they are amplified, and are coupled from the output of amplifier 245B to the primary of transformer T2. Transformer T2, in turn, couples these incoming message signals to port D2 (comprised of terminals 225 and 227), which is coupled to recorder circuit 370 via the pair of lines denoted as 387 in FIG. 3.

Also because switch S2 is open, DTMF signals appearing across terminals 280 and 285 are amplified by amplifiers 245A and 245B. These DTMF signals are detected and decoded by DTMF decode circuit 270, which outputs corresponding binary data signals on bus 378. These data signals are coupled to microprocessor 363 (see FIG. 3), and thus enable answering machine 325 to be remotely controlled by the remote remote-control telephone in a conventional manner.

When answering machine 325 has finished recording a message or has otherwise completed its operations, microprocessor 363 causes switch S6 to open. This has the effect of hanging up the line.

Alternatively, answering machine 365 may be operated in a local remote-control mode. This is accomplished, as previously described, by taking any of local remote-control telephones 160A–160C off hook at a time when no ringing signal is or recently has been present on the line (or, if call progress circuit 140 is used, a dial tone is detected), and by transmitting from the local remote-control telephone a predetermined DTMF security code (such as ###). When the local remote-control telephone is taken off hook, as detected by off-hook detect circuit 155, switch S3 is closed and switches S2, S4 and S6 are open. As before described, the DTMF signals are detected across terminals 280 and 285, are decoded by DTMF decode circuit 270, and are coupled in binary form to microprocessor 363. In response to receipt of the security code within a predetermined period of time after the telephone has gone off-hook, microprocessor 363 causes switch S3 to open (increasing the gain of the amplifier block comprising amplifier 245B), and switches S2 and S4 to closed (switch S6 remains open). The closing of switches S2 and S4 enables amplifier 240, and causes signals appearing across resistor 255 (rather than those appearing across terminals 280 and 285) to be coupled to amplifier 245A. Amplifier 240 now decreases the magnitude of AC signals transmitted onto telephone line 183 from sources other than answering machine 325 in order to reduce interference caused by these signals with messages to be played back through the local remote-control telephone, while coupling the output of message playback circuit 375 to the telephone line for transmission to the local remote-control telephone. DTMF signals transmitted from the local remote-control telephone appear across sense resistor 255, are coupled to DTMF decode circuit 270 by amplifiers 245A and 245B, are decoded by DTMF decode circuit 270, and are coupled to microprocessor 363 in binary form all as previously described. Thus, any local remote-control telephone 160A–160C may control answering machine 325 to retrieve recorded messages in a manner similar to the apparatus of FIGS. 1 and 2.

Thus, an improvement for a telephone answering machine controller has been disclosed that enables the answering machine to be remotely controlled by any DTMF-capable remote remote-control telephone, as well as by any local remote-control telephone. The local remote-control telephone may be coupled in parallel with the answering machine and to the same telephone line to which the answering machine is coupled, and at a location physically remote from the answer machine. Because the invention reduces interference with messages being played back through the local remote-control telephone caused by signals received from the Central Office, it is not necessary to place other circuitry (such as a PBX, Key Telephone System, or other controller) in series between the telephone line and the Central Office telephone network.

Figure 4A:
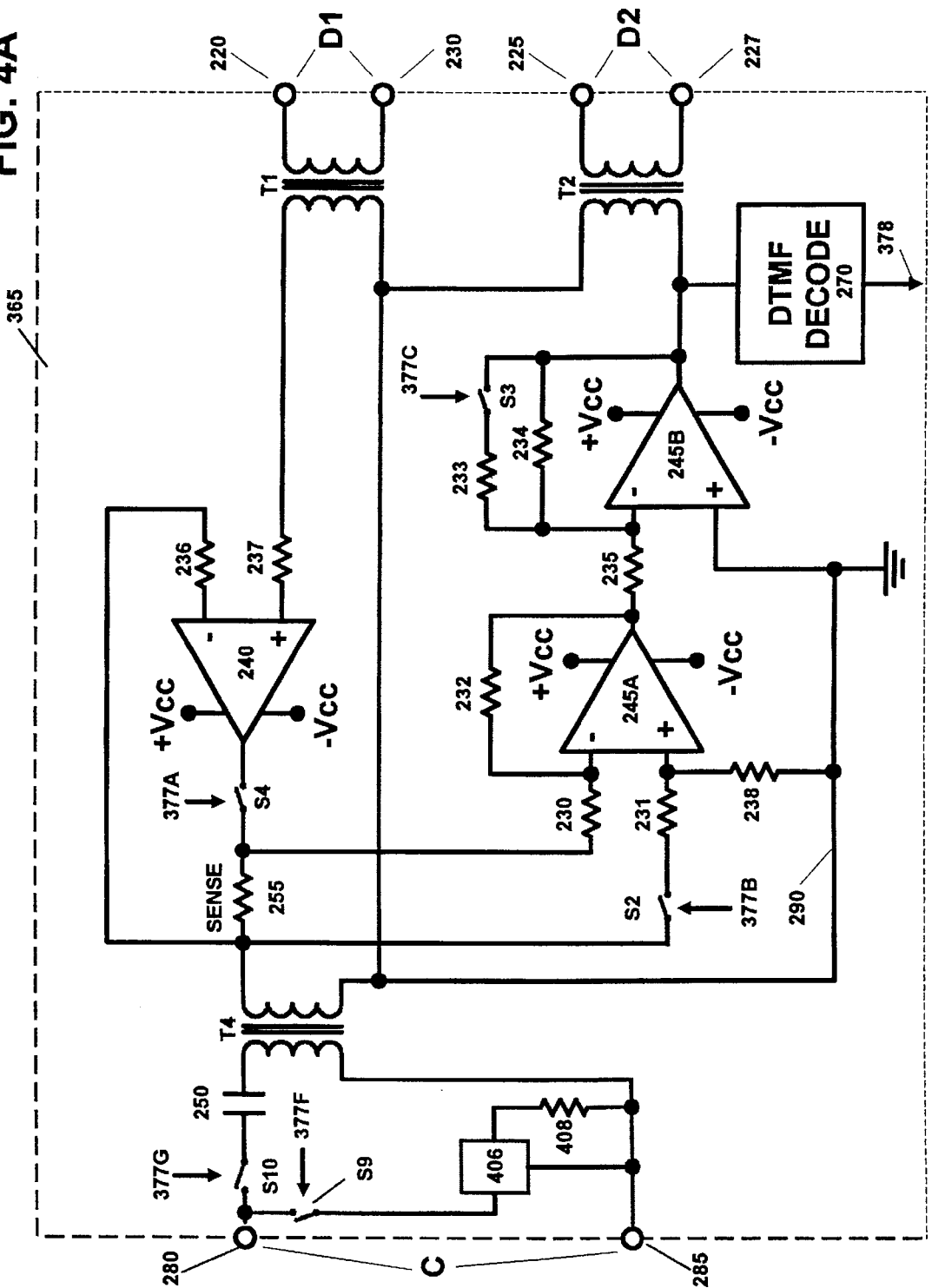
FIG. 4A is an alternative circuit diagram of the exemplary embodiment of the line driver of FIG. 4.

FIG. 4A shows an alternative embodiment of the circuit of FIG. 4. In FIG. 4A, the circuitry of FIG. 4 has been modified by the addition of an FCC Part 68 telephone line coupling transformer T4, switches S9 and S10 (preferably, but not necessarily, normally-open relays) respectively actuated by control signals received from logic circuit 363 over control lines 377F and 377G, a 3-terminal, series-pass integrated circuit linear voltage regulator 406, and a resistor 408. In order to minimally degrade the performance of Line Driver 365 in reducing the amplitude of undesirable audio signals transmitted by the Central Office, the windings of transformer T4 should have a very low DC resistance (preferably a few ohms or less). Also for this reason, capacitor 250 should be very large in order to present a very low AC impedance. Also in FIG. 4A, as compared to FIG. 4, switch S6 has been removed.

In a first (default) mode of operation, when answering machine 325 is on-hook and all telephones 160A–C are also on hook, switch S9 is open to prevent the flow of DC current between the Tip and Ring conductors of telephone line 183. Additionally, switch S10 is open to decouple transformer T4 from telephone line 183. If there is an incoming telephone call, Logic circuit 363 upon detecting a predetermined number of rings (via Ring Detect circuit 150) answers the call by closing switch S9. This causes voltage regulator 406 and resistor 408 to conduct a DC current between the Tip and Ring conductors of telephone line 183 sufficient to signal to the Central Office that answering machine 325 has "picked up" the line and is now off-hook. In addition, switch S10 is closed to couple AC signals to the circuitry of answering machine 325 via transformer T4. Once having answered a call, answering machine 325 operates in a conventional fashion to record messages or to respond to received remote-control command signals transmitted from a remote remote-control telephone to play back recorded messages or otherwise to perform remote-control functions. The answering machine hangs up the line when switches S9 and S10 are again opened by Logic circuit 363.

In a second (local remote-control) mode of operation, the answering machine of which FIG. 4A forms a part can be operated responsive to locate remote-control command signals transmitted by any of telephones 160A–C. If any of telephones 160A–C go off-hook other than in response to an incoming telephone call (as determined by Logic circuit 363 in response to the absence of ringing signals received from Ring Detect circuit 150 within a predetermined time of Off-Hook Detect circuit 140 signaling that line 183 has gone off-hook), Logic circuit 363 closes switch S10 to enable Line Driver circuit 365 to "listen" for the presence of a local remote-control security code sequence transmitted from one of telephones 160A–160C. Upon receiving such a command sequence, controller 305 enters its local remote-control state of operation and as previously described with respect to FIGS. 3 and 4. Note that such local remote-control operation does not require that answering machine 325 actually pick up the line by the closing of switch S9, because the necessary command and message signals will be passed from port C through closed switch S10 and capacitor 250, and across transformer T4, to the circuitry of Line Driver 365.

Although FIG. 4A shows switch S10 in series with capacitor 250 and the primary side of transformer T4 to decouple the Line Driver from telephone line 183, persons skilled in the art will recognize that this switch could, if desired, be eliminated so that the primary side of transformer T4 is coupled to port C through capacitor 250 at all times. Switch S10 is preferred, however, because it advantageously reduces the AC loading on telephone line 183 at times when Line Driver circuit 365 does not need to monitor the telephone line, or pass AC signals between the telephone line and the answering machine.

Figure 5:
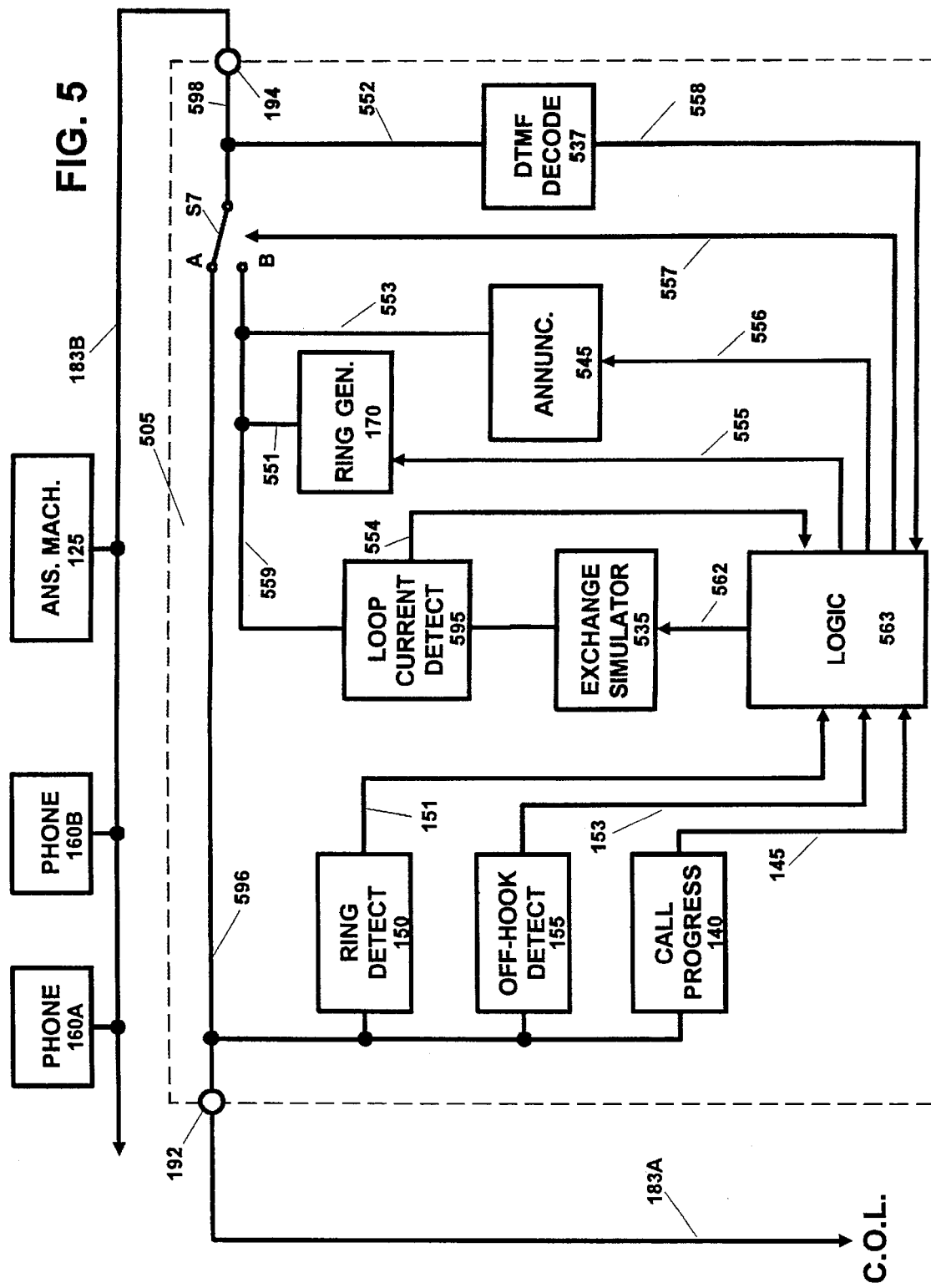
FIG. 5 is a block circuit diagram of another exemplary embodiment of the controller of the present invention coupled in series between a Central Office and an answering machine.

FIG. 5 illustrates yet another embodiment of the invention. Because the circuitry of the embodiments of FIGS. 1–4A operate to suppress audio signals transmitted from the Central Office by lowering the AC impedance of telephone line 183, applicable FCC part 68 rules might limit or restrict attachment of the circuitry to the public switched network (despite the use of protective circuitry, such as line-coupling transformers T4 and T5 shown in FIGS. 2A and 4A). The embodiment of FIG. 5 has particular application in such circumstances.

In the embodiment of FIG. 5, a local remote-controller device 505 is coupled in series between a first portion of a dwelling's conventional 2-conductor telephone line 183A coupled to a Central Office via a public switched telephone network (Central Office Line, or "C.O.L."), and a second portion of the telephone line 183B that may also be within the same dwelling. Controller 505 is coupled to telephone line 183A via a first conventional RJ-11 jack 192, and to telephone line portion 183B via a second RJ-11 jack 194.

Coupled to telephone line 183B are one or more conventional DTMF-capable telephones 160. (In FIG. 5, two such telephones 160A and 160B are shown, although fewer or more than these two telephones may be utilized with the invention.) These telephones 160 are coupled in a conventional manner in parallel with one another and across the Tip and Ring conductors of telephone line 183B. Also coupled across telephone line 183B, at a location along the telephone line that may be physically remote from the locations at which telephones 160A and 160B are coupled to the line, is answering machine 125. As previously described, answering machine 125 is of the type capable of being remotely controlled by DTMF signals transmitted to it from a remote remote-control telephone.

Controller 505 includes Ring Detect circuit 150, Off-Hook Detect circuit 155 and Call Progress Detect circuit 140 coupled to line 596 (which, as in the case of the embodiments of FIGS. 1 and 3, comprises a pair of conductors coupled to telephone line 183A through jack 192). Ring Detect circuit 150 thus functions, as previously described, to detect when ringing signals appear on telephone line 183A indicative of a remote telephone (not shown in FIG. 5) attempting to place a call over the public switched telephone network to a telephone coupled to telephone line 183B. Also as already described, Off-Hook Detect circuit 155 functions to detect whether telephone line 183A is off-hook or on-hook. Call Progress circuit 140 outputs on line 145 digital signals indicative of the presence on telephone line 183A of supervisory tones transmitted from the Central Office.

Coupled to circuits 150, 155 and 140 is Logic circuit 563. Similarly to logic circuits 163 and 363 of FIGS. 1 and 3, Logic circuit 563 preferably comprises microprocessor-based logic programmed to accomplish the timing, sequencing and control of the various functions to be discussed below. Persons of ordinary skill in the art will readily understand how to program such a microprocessor or microcontroller based on the description of its functions and operations to follow. Alternatively, Logic circuit 563 may be implemented as hard-wired logic including NAND gates, NOR gates, counters, timers, and other well-known and conventional logic blocks to implement the required functions and operations to be described. Again, the implementation of such hard-wired circuitry will be readily apparent to those having ordinary skill in the art.

Also included within Controller 505 is a switch S7. This switch preferably comprises a conventional relay having a coil (not shown) actuated by a control signal received on line 557 from Logic circuit 563. The relay includes double pole, double throw switch contacts that respectively couple the two (T and R) conductors of telephone line 183B entering controller 505 via jack 194 and conductors 598 either to the corresponding two (T and R) conductors of telephone line 183A via lines 596 and jack 192 (path "A") or, alternatively, to a pair (T and R) of conductors 559 (path "B"). Switch S7 thus functions to couple the T and R conductors of telephone line 183B (and, hence, telephones 160, and answering machine 125) directly to the T and R conductors of telephone line 183A or, alternatively, to the circuitry of Controller 505. Persons of ordinary skill in the art will appreciate that switch S7 alternatively could be implemented using solid-state transistor switch circuitry, if desired.

Additionally included in Controller 505 coupled across the T and R conductors of telephone line 183B is DTMF decode circuit 537. DTMF decode circuit 537, which may comprise any of a variety of commercially available integrated circuits, detects the presence of DTMF tone signals on telephone line 183B, decodes those tones, and responsively produces digital data signals corresponding to the decoded DTMF tones. These digital data signals, which are indicative of the decoded DTMF tones and hence of the telephone keys actuated by a user of telephones 160A or 160B, are coupled to Logic circuit 563 via data lines 558.

When relay switch S7 is in position B, the T and R conductors of telephone line 183B are coupled to Exchange Simulator 535, via conductors 559, through Loop Current Detect circuit 595. Exchange Simulator 535 includes a conventional D.C. regulated power supply (not shown) for the purpose of simulating on-hook and off-hook conditions for telephone line 183B when relay switch S7 is in position B. In addition, Exchange Simulator provides power for those devices coupled to telephone line 183B when switch S7 is in position B that draw all or a portion of their power requirements from the telephone line. The Exchange Simulator preferably impresses onto line 559 a first DC voltage (preferably, approximately +48 volts) to simulate the DC condition of a telephone line when the line is on-hook, and a second DC voltage (preferably, approximately +10 volts) to simulate the DC condition of a telephone line when the line is off-hook. Such simulation ensures that substantially all conventional telephones 160 and answering machines 125 will work properly with Controller 505 (and vice versa).

The voltage generated by Exchange Simulator 535 is selectively determined by control signals communicated to it by Logic circuit 563 via control line 562. With switch S7 in position B, when Logic circuit 563 detects that telephone line 183B is on-hook (the default state), Exchange Simulator 535 generates a simulated on-hook voltage. However, when Logic circuit 563 detects that telephone line 183B has been taken off-hook, as would occur when any of telephones 160 or the answering machine 125 has picked up the telephone line 183B, Exchange Simulator 535 generates a simulated off-hook voltage. To protect against catastrophic short circuits, the current generated by Exchange Simulator preferably is current-limited in a conventional manner.

Exchange Simulator 535 preferably is implemented using a conventional integrated circuit voltage regulator, such as an LT-317 positive adjustable voltage regulator available from Linear Technology Corp. (an LT-317 may also be used to implement Off-Hook Detect circuit 195, previously described with respect to FIG. 1). This integrated circuit is capable of producing a DC voltage output that is adjustable as a function of a feedback voltage applied to the circuit's adjustment terminal. Persons of ordinary skill in the art will understand how the LT-317 may be used to achieve a power supply selectively capable of producing the two desired on-hook and off-hook voltages.

While Exchange Simulator 535 has been described above in the context of producing both on-hook and off-hook voltages, which would ensure that Controller 505 compatibly operates with substantially all commercially available stand-alone answering machines and telephones that are adapted for being coupled to a public switched telephone network, Exchange Simulator 535 alternatively may be implemented to generate only an on-hook (high) voltage. In most cases, such single-voltage operation of Exchange Simulator 535 will be acceptable.

Loop Current Detect circuit 595 is coupled in series between the output of Exchange Simulator 535 and line 559 to detect the magnitude of current flowing through telephone line 183B when switch S7 is in position B. Loop Current Detect circuit 595 may be substantially any conventional circuitry adapted to measure current flowing through line 559, and preferably includes an A/D converter for providing an 8-bit digital data signal indicative of the magnitude of that current. This data signal is coupled via data lines 554 to an input port of Logic Circuit 563.

Further included within Controller 505 are Ring Generator circuit 170 and, optionally, Annunciator circuit 545. Ring Generator 170, previously described with respect to FIG. 1, is transformer-coupled to line 559 via conductors 551 and operates, upon command of Logic circuit 563 via control line 555, to impress onto telephone line 183B (when switch S7 is in position B) a simulated ringing signal (e.g., 90 v at 20 Hz). Annunciator circuit 545 is optionally provided to transmit onto telephone line 183B (when switch S7 is in position B), audio tones and/or digitally-generated (synthesized, or prerecorded) "spoken" messages under control of Logic circuit 563. Annunciator 545 is under control of Logic circuit 563 via control line 556.

Local remote-control circuit 505 operates as follows. As was the case with the local-remote control circuitry of FIGS. 1-4A, controller 505 of FIG. 5 is operative in two states. In a first (default) state, switch S7 is caused by Logic circuit 563 to be in position A, Ring Generator circuit 170 is off or disabled, and optional Annunciator circuit 545 (if present) also is off or disabled. In addition, Exchange Simulator 535 although not coupled yet to telephone line 183 B generates a first ("on-hook") voltage. In this default state, the public switched telephone network (C.O.L.) is coupled via telephone lines 183A directly through switch S7 to telephone lines 183B and, hence, to telephones 160 and answering machine 125. Telephones 160 and answering machine 125 thus operate in their normal manner, and as if controller 505 was not there. In this first mode of operation of controller 505, telephones 160 may initiate outgoing telephone calls over the public switched network or answer incoming ones, and answering machine 125 may automatically pick up the telephone line in conventional response to ringing signals transmitted from the switched network signaling an incoming call. Upon a user picking up the handset from the cradle of one of telephones 160, a dial tone will be obtained automatically and an outgoing call may be made without having to send any commands to controller 505. In addition, in this first mode of operation, answering machine 125—upon its having answered an incoming telephone call—may be remotely controlled in its normal manner by DTMF signals transmitted from a remote remote-control telephone that placed the call via the switched network.

Logic circuit 563 causes controller 505 to enter its second (local remote-control) state of operation if: (1) telephone line 183B is taken off-hook either when no ringing signals are present on telephone line 183B or when no ringing signals recently have been present (e.g., within at least one complete ringing signal cycle), as determined by Logic circuit 563 in response to signals received from Off-Hook Detect circuit 155 and Ring Detect circuit 150, and (2) a sequence of one or more DTMF signals indicative of a predetermined local remote-control security code is transmitted by one of the local remote-control telephones 160 within a predetermined period of time following the telephone line going off hook (as determined by Logic circuit 563 comparing the sequence to a pre-stored security code). When this second state is entered, Logic circuit 563 causes switch S7 to transition to position B. This de-couples telephone line 183B from telephone line 183A and the switched telephone network, and couples it instead to the circuitry of Controller 505. As will be apparent from FIG. 5 and as further discussed below, however, Ring Detect circuit 150 and Call Progress circuit 140 remain coupled to telephone line 183A to detect and communicate to Logic circuit 563 the presence on telephone line 183A of ringing signals and/or call progress signals indicative of an incoming telephone call.

When switch S7 is switched to position B, telephone line 183B is coupled through line 559 to Exchange Simulator 535 through Loop Current Detect circuit 595. When this coupling first occurs, Exchange Simulator 535 impresses an "on-hook" voltage across telephone line 183B to simulate an on-hook condition on the line (even though at least one telephone 160 has gone off-hook in order to transmit the local remote-control security code). Thus, even though telephone line 183B is technically off-hook (because at least one of telephones 160A and 160B is off-hook), answering machine 125 will thus "believe" that the line is on-hook. (Telephone line 183A, because it is decoupled from telephone line 183B, will be seen from the Central Office as being on-hook.)

With switch S7 in position B and at least one of telephones 160A and 160B off-hook (with Exchange Simulator initially generating an on-hook voltage), a first current will flow via telephone line 183B through the telephone 160 that has gone off-hook. Loop Current Detect circuit 595 detects and measures the magnitude of this first current, and communicates that magnitude to Logic circuit 563 via data lines 554. From this, Logic circuit 563 determines that telephone line 183B has been taken off-hook (even though Exchange Simulator at this point is still generating an on-hook voltage). Logic circuit 563 thus "knows" that telephone line 183B is off-hook even though answering machine 125 does not. Logic circuit 563 stores the magnitude of this first current.

With switch S7 in position B as a result of the transmission by a local remote-control telephone 160 of the local remote-control security code, Logic circuit 563 next causes Ring Generator 170 to impress a simulated ringing signal onto telephone line 183B. Preferably, although not necessarily, the cadence of this ringing signal generated by Ring Generator circuit 170 is distinctly different from that of a conventional ringing signal.

When the simulated ringing signal appears on telephone line 183B, answering machine 125 will detect the signal and respond in its normal fashion by "picking up" telephone line 183B after a predetermined number of rings. When this occurs, a second current attributable to the answering machine additionally will flow through telephone line 183B. The aggregate of the first and second currents are measured by Loop Current Detect circuit 595, and communicated via data lines 554 to Logic circuit 563. Based on knowing the first current, Logic circuit 563 computes the magnitude of the second current attributable to the answering machine's having picked up line 183B. Logic circuit 563 then commands Ring Generator 170 via control line 555 to cease generating the simulated ringing signal. In addition, Logic circuit 563 via control line 562 optionally causes Exchange Simulator 535 to reduce the voltage on telephone line 183B to that indicative of telephone line 183B being off-hook. (If this is caused to occur, the magnitude of current conducted by telephone line 183B through the answering machine and the telephone that is off-hook may change. To compensate for this, Logic circuit 563 preferably again stores the magnitude of current conducted by telephone line 183B at the off-hook voltage as detected by Loop Current Detect circuit 595. Based on the proportion by which the aggregate of the first and second currents decreases when the simulated voltage drops from its on-hook value to its off-hook value, Logic circuit 563 then calculates the values of the individual first and second currents at the off-hook voltage.)

When answering machine 125 goes off-hook in response to the simulated ringing signals as just described, it will operate in its conventional manner typically by playing a greeting message. At this time, DTMF signals may be transmitted by a user via any of local remote-control telephones 160 coupled to telephone line 183B (1) to cause the answering machine to enter its remote-control mode of operation, and (2) subsequently to operate the answering machine by local remote-control in order to retrieve and hear through the local remote-control telephone one or more recorded messages, or otherwise remotely to control the machine's various remote-controllable functions.

When all or desired ones of the answering machine's messages have been retrieved and heard through the local remote-control telephone 160, or other remote operations have been completed, the local remote-control telephone may be hung up. When this occurs, the current flowing through telephone line 183B will decrease either to zero or close to zero (if answering machine 125 has also hung up), or to the second value indicative of the answering machine still being off-hook (assuming that no other telephones are also off-hook). Alternatively, if answering machine 125 hangs up first, Logic circuit 563 detects this by detecting a change in current having a magnitude attributable to the answering machine having hung up. In these cases, Logic circuit 563 via control line 562 causes Exchange Simulator 535 to interrupt for a few hundred (e.g., 500) milliseconds the voltage supplied to telephone line 183B in order to generate a Calling Party Control signal the purpose of which is to induce answering machine 125 to hang up the line (if it has not already done so). Calling Party Control signals of this type are used by many public telephone lines to signal the end of a call. Answering machines and other devices designed to respond to such signals immediately respond by hanging up. Following this, controller 505 automatically re-enters its default state as heretofore described, including by switching switch S7 back to position A in order to re-connect telephone line 183B to the Central Office switched network.

Alternatively or in addition to the foregoing, Logic circuit 563 is programmed to respond to a unique "Hangup" command transmitted from any of local remote-control telephones 160. Such a command preferably comprises a user-programmable, predetermined sequence of one or more DTMF tones that would not be recognized by answering machine 125 as a valid remote-control command. The Hangup command may be used at any time by a user to command controller 505 to generate the Calling Party Control signal, and to re-enter its default state to re-connect telephone line 183B to telephone line 183 A and the Central Office switched network. Furthermore, to avoid an undesirable situation in which controller 505 enters and remains in its local remote-control state of operation for an unintended long period of time, Logic circuit 563 preferably is programmed to time out after a predetermined time period after it has entered the local remote-control state, or after failing to receive DTMF tones from a local remote-control telephone, in order automatically to generate the Calling Party Control signal and to revert to its default state.

Thus, a local remote-control device 505 has been described that is operative to enable a telephone such as any of telephones 160, coupled to the same telephone line as an answering machine, to act as a local remote-control telephone capable of retrieving messages recorded by the answering machine. The local remote-control telephones may be used for this purpose even though they are coupled to the telephone line at locations that are physically remote from (e.g., in a different room than) the answering machine. When switch S7 is in position B, messages and other audio signals transmitted from the Central Office to the telephone line on which the local remote-control telephone is located are reduced (in this embodiment, eliminated entirely) so as not to interfere with the retrieval of messages from the answering machine by the local remote-control telephone.

In accordance with yet a further aspect of the present invention, the local remote-control device 505 of FIG. 5 provides the capability for a user to answer an incoming telephone call using any of local remote-control telephones 160A or 160B, even while that telephone is off-hook and being used to retrieve messages from answering machine 125. This functionality is provided by Ring Detect circuit 150 in conjunction with Logic circuit 563, as described below.

If controller 505 is in its local remote-control (second) state of operation with switch S7 in position B at the time of an incoming telephone call, Ring Detect circuit 150 detects the presence of ringing signals on telephone line 183A and communicates a digital RING signal to Logic circuit 563 via line 151. (Alternatively, call progress circuit 140 detects the characteristic cadence and tones of call progress signals indicative of a ringing signal as heard through a telephone set, and responsively reports the presence of a ringing signal on the telephone line to Logic circuit 563 via line 145.) Telephones 160A and 160B will not ring in response to these ringing signals because switch S7 is in position B. However, Logic circuit 563 in response to the RING signal from Ring Detect circuit 150 causes Annunciator 545 to transmit to telephones 160A and 160B (via telephone line 183B) an audible signal (such as a distinct tone, or optionally a digitally synthesized voice message) to inform the user retrieving messages from answering machine 125 of the presence of the incoming call. Additionally or alternatively, Logic circuit 563 causes Ring Generator 170 to impress a synthesized ringing signal onto telephone line 183B to cause telephones 160 to ring with a conventional or distinctive cadence to indicate to the user the presence of an incoming telephone call (depending on the manner of operation of the particular telephones 160 used, it may occur that only on-hook telephones will ring in response to the ringing signal).

At this point, the user may elect to continue to use the local remote-control telephone to retrieve messages rather than answer the incoming telephone call. Alternatively, however, the user may instead answer the call. This is accomplished by transmitting from the local remote-control telephone a user-programmable, predetermined sequence of one or more DTMF tones indicative of an "Answer Call" command, which sequence preferably is different from any other sequence of tones that would be recognized by answering machine 125 as a valid remote-control command. When Logic circuit 563 detects the presence of the Answer Call command, as decoded by DTMF decode circuit 537, Logic circuit 563 via control line 562 causes Exchange Simulator 535 to issue a Calling Party Control signal. If answering machine 125 is of the type that recognizes the Calling Party Control signal as a signal that the call has ended, it will hang up. When Logic circuit 563 detects (by way of Loop Current Detect circuit 595) that answering machine 125 has hung up the line, Logic circuit 563 muses local remote-control device 505 to re-enter its default state. (Alternatively, Logic circuit 563 upon receipt of the Answer Call command may simply assume that answering machine 125 has gone on-hook in response to the Calling Party Control signal, and automatically cause Controller 505 to re-enter its default state without determining that, in fact, answering machine 125 has returned to its on-hook state. In addition, or alternatively, Logic circuit 563 produces a series of user-preprogrammed DTMF remote-control commands compatible with the particular brand of answering machine 125 being used, to cause the answering machine to stop playing messages or whatever else it may be doing. This is done to ensure that answering machine 125, if it has not hung up, at least will not interfere with the answering of the telephone call by playing back or recording messages at the time the default state is re-entered.) The re-entry of controller 505 into its default state results in switch S7 transitioning back to position A, which muses the incoming telephone call immediately to be answered because the particular telephone 160A or 160B that was being used to retrieve messages from answering machine 125, and that was used to command controller 505 to re-enter its default state, is still off-hook. When the telephone call is completed, the local remote-control telephone may be hung up so that another telephone call may be initiated or an incoming one answered.

It is preferable, although not necessary, to preclude controller 505 from responding to DTMF tones transmitted advertently or inadvertently from a remote remote-control telephone while the controller is in its default state (and, thus, susceptible to receiving such DTMF tones). To minimize the possibility of this occurring, Logic circuit 563 preferably is programmed to ignore all received DTMF signals when controller 505 is in the default state unless the predetermined local remote-control security code is first received in a defined manner. More particularly, Logic circuit 563 is programmed to respond to DTMF tones when controller 505 is in its default state only if: (1) the local remote-control security code is received within a first defined period of time (e.g., 5 seconds) following telephone line 183B going off-hook, and (2) no ringing signals have been received from the public switched telephone network for a second defined period of time greater than a period of one ringing cycle (the first and second defined periods of time may, of course, be equal or disparate). Alternatively or in addition to the foregoing, Logic circuit 563 is programmed to respond to DTMF local remote-control security code signals only if such signals are received when telephone line 183B is off-hook and a dial tone has been detected by Call Progress Detect circuit 140 within a defined period of time (e.g., 3 seconds) prior to the receipt of the security code. This assures that controller 505 will only respond to DTMF tones transmitted by local remote-control telephones 160, because a dial tone ordinarily will appear on telephone line 183A from the Central Office only when one of telephones 160A or 160B is taken off-hook at a time when there is no incoming telephone call (although the dial tone ordinarily will cease once a DTMF tone is impressed on telephone line 183A by the telephone 160).

Figure 6:
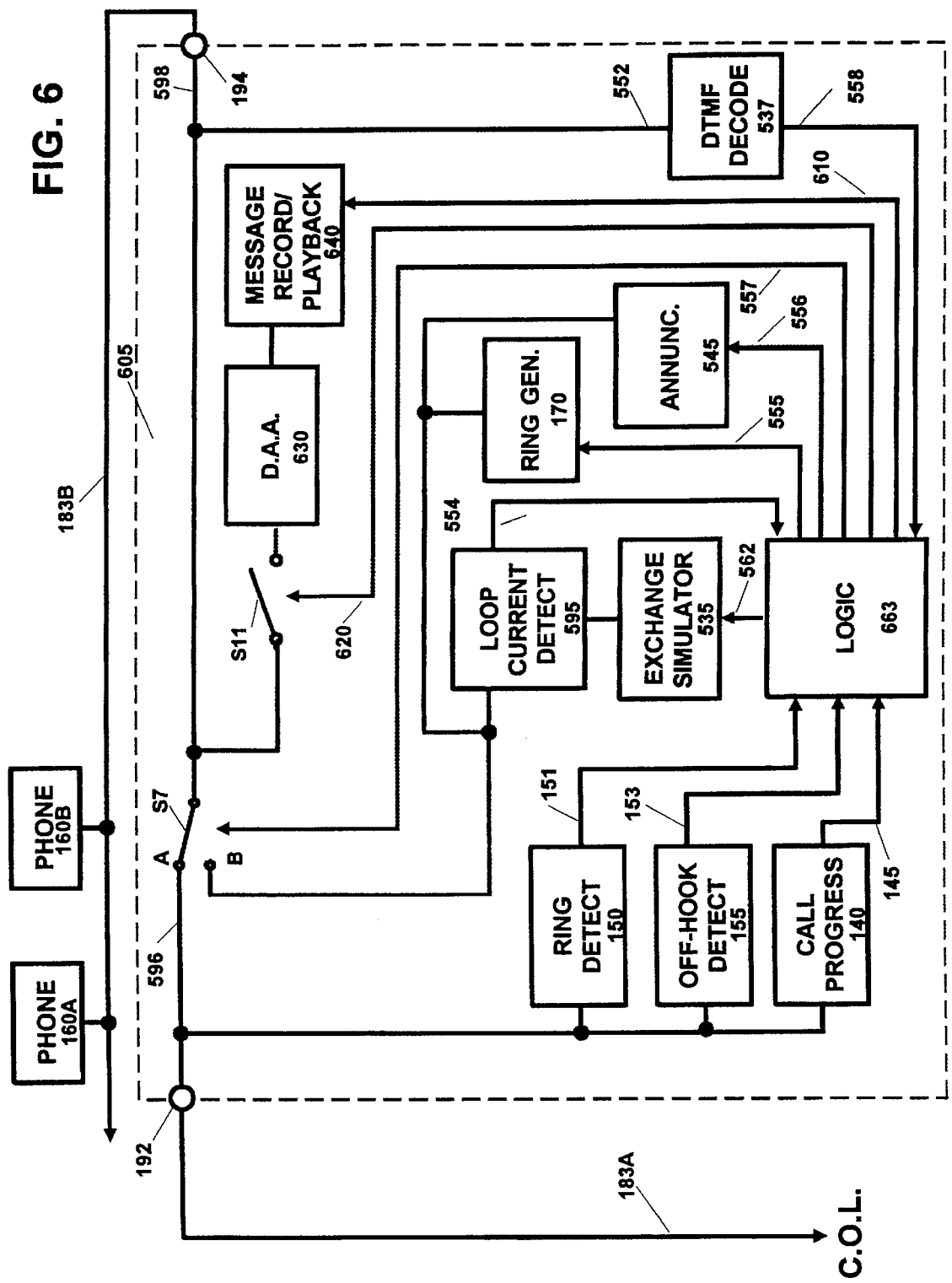
FIG. 6 is a block circuit diagram of an alternative embodiment of FIG. 5, in which the present invention is placed integrally within an improved telephone answering machine.

FIG. 6 shows an alternative embodiment of the invention of FIG. 5. In FIG. 6, local remote-control circuitry has been implemented integrally within an improved telephone answering machine 625. Answering machine 625 may be placed at the point of entry into a dwelling of a telephone line 183A, and remote from telephones 160A, 160B, etc. coupled to telephone line 183B elsewhere within the dwelling.

The circuitry of answering machine 625 is similar to that of FIG. 5, except that a normally open switch S11 (which preferably comprises a double pole relay for connection to the T and R conductors, but may alternatively be a solid-state switch) has been added in series with a conventional Data Access Arrangement (D.A.A.) circuit 630 (compliant with applicable FCC Rules, Part 68), to which in turn is coupled conventional answering machine circuitry 640 for recording and playing back audio messages. Switch S11 is actuated by a control signal received from Logic Circuit 663 via control line 620. Message/record circuit 640 is controlled, by control signals received from Logic Circuit 663 via control lines 610, to playback and to record messages left by received telephone calls, as well as (optionally) to play back a greeting message.

Logic Circuit 663 operates similarly to Logic Circuit 553 (FIG. 5), except for the manner of controlling switch S11, Message Record/Playback circuit 640, Exchange Simulator 535, and Ring Generator 150 (as discussed below). In particular, Logic Circuit 553 controls answering machine 625 to operate, as earlier explained, in two modes of operation: a first (default) mode in which switch S7 is in position A, and a second (local remote-control) mode in which switch S7 is in position B.

In its default mode of operation, when switch S7 is in position A, telephones 160 operate in a conventional fashion as previously described with respect to FIG. 5. In addition, answering machine 625 operates in the manner of a conventional answering machine also as previously described. Upon detecting (via Ring Detect circuit 150) a predetermined number of ringing signals appearing on telephone line 183A (indicative of an incoming telephone call, made by a remote remote-control telephone (not shown)) that has not been picked up by any of local remote-control telephones 160), Logic Circuit 663 closes switch S11 to cause answering machine 625 to pick up the line and, thus, to "answer" the call. With switch S11 closed, conventional D.A.A. circuit 630 provides a D.C. current path by which the Central Office detects that the telephone line has gone off-hook, and couples the telephone fine to Message Record/Playback circuit 640. Logic Circuit 663 then actuates Message Record/Playback circuit 640 via control lines 610 to play a greeting message (optionally) and then to record an incoming message. Alternatively or additionally, answering machine 625 can respond to DTMF command signals transmitted to it, by the person making the call using the remote telephone (not shown in FIG. 6), to perform various functions in a conventional manner. These functions include recording a new greeting message, playing back recorded messages, and other well-known functions. Such DTMF command signals, if sent by the remote remote-control telephone, are decoded by DTMF decode circuit 537 and the decoded signals are coupled to Logic circuit 663 as heretofore described. It will be appreciated, by inspection of FIG. 6, that in the default mode of operation of answering machine 625 telephones 160 are coupled to telephone line 183A and may be used in their ordinary manner as if answering machine 625 were not coupled to the line.

Answering machine 625 is placed in its second (local remote-control) mode of operation, as previously explained, upon receipt from any of telephones 160 of a predetermined, user-programmable local remote-control security code. Upon receipt of the security code, Logic circuit 663 actuates switch S7 to position B. This operatively disconnects telephone line 183B and telephones 160 from receiving messages and other audio signals from the public telephone network that might interfere with local remote-control of answering machine 625 by telephones 160 as previously discussed. (While switch S7 is shown in FIG. 6 as disconnecting entirely telephone line 183A from line 183B, it will be appreciated to persons skilled in the art that the present invention may be implemented to operatively disconnect the two telephone line portions without completely severing their connection. For example, the lines could still be connected to the extent of allowing D.C. power to flow to telephone line 183B from the Central Office, if desired. By "operatively disconnected," it is meant that the two telephone lines are decoupled to the extent necessary to eliminate entirely, or to substantially reduce to a non-interfering level, audio signals that may be transmitted from the Central Office.)

In addition to the foregoing, Logic circuit 663 closes switch S11 to operatively couple answering machine 625 to telephones 160 for the purpose of playing back, through telephones 160, messages that the answering machine had previously recorded, or for other purposes such as recording a greeting or other message or otherwise remotely controlling other ones of the answering machine's functions. (The closing of switch S11 may be such as to cause answering machine 625 to pick up the telephone line, as in the default mode of operation. Alternatively, D.A.A. circuit 630 may be arranged so that, in the second mode of operation, the closing of switch S11 simply A.C. couples answering machine 625 to telephone 183B while blocking the flow of D.C. current—thus operatively coupling answering machine 625 to the telephone line in the second mode without actually picking up the line.) Note that in the embodiment of FIG. 6, it is unnecessary to couple to telephone line 183B to a synthesized ringing signal at this point in the operation of the system because answering machine 625—and, in particular, switch S11—are controlled directly by integrally located Logic circuit 663.

Once answering machine 625 has been placed in its local remote-control mode of operation, it may be controlled by DTMF commands transmitted by any of local remote-control telephones 160 as previously discussed. While answering machine 625 is in this local remote-control state, an incoming telephone call received on telephone line 183A will be detected by Logic circuit 663 in response to a RING signal produced by Ring Detect circuit 150 on line 151. Logic circuit 663 responds to this, as discussed with respect to FIG. 5, by signaling the user of telephones 160. This signaling may be by transmission to telephones 160 of an audible tone or voice message produced by annunciator circuit 545. Alternatively or in addition to this, Logic circuit causes Ring Generator circuit 170 to generate a synthesized ringing signal to cause a telephone coupled to telephone line 183B to ring, preferably in a distinctive fashion, to indicate the presence of the incoming call. As earlier explained, a user of the telephones 160 then may elect either (1) to continue to retrieve messages (i.e., to ignore the incoming call), or (2) to answer the telephone call by transmitting to answering machine 625 a predetermined DTMF command to cause the answering machine (a) to stop its present operation, (b) to hang up (caused by Logic circuit 663 opening switch S11), and (c) to revert to its default mode of operation (caused by Logic circuit 663 actuating switch S7 back to position A). Upon switch S7 being actuated to position A, the telephone call will be automatically answered if one of telephones 160 is off hook at that moment (which ordinarily will be the case if the telephone was being used to retrieve messages from answering machine 625).

Figure 7:
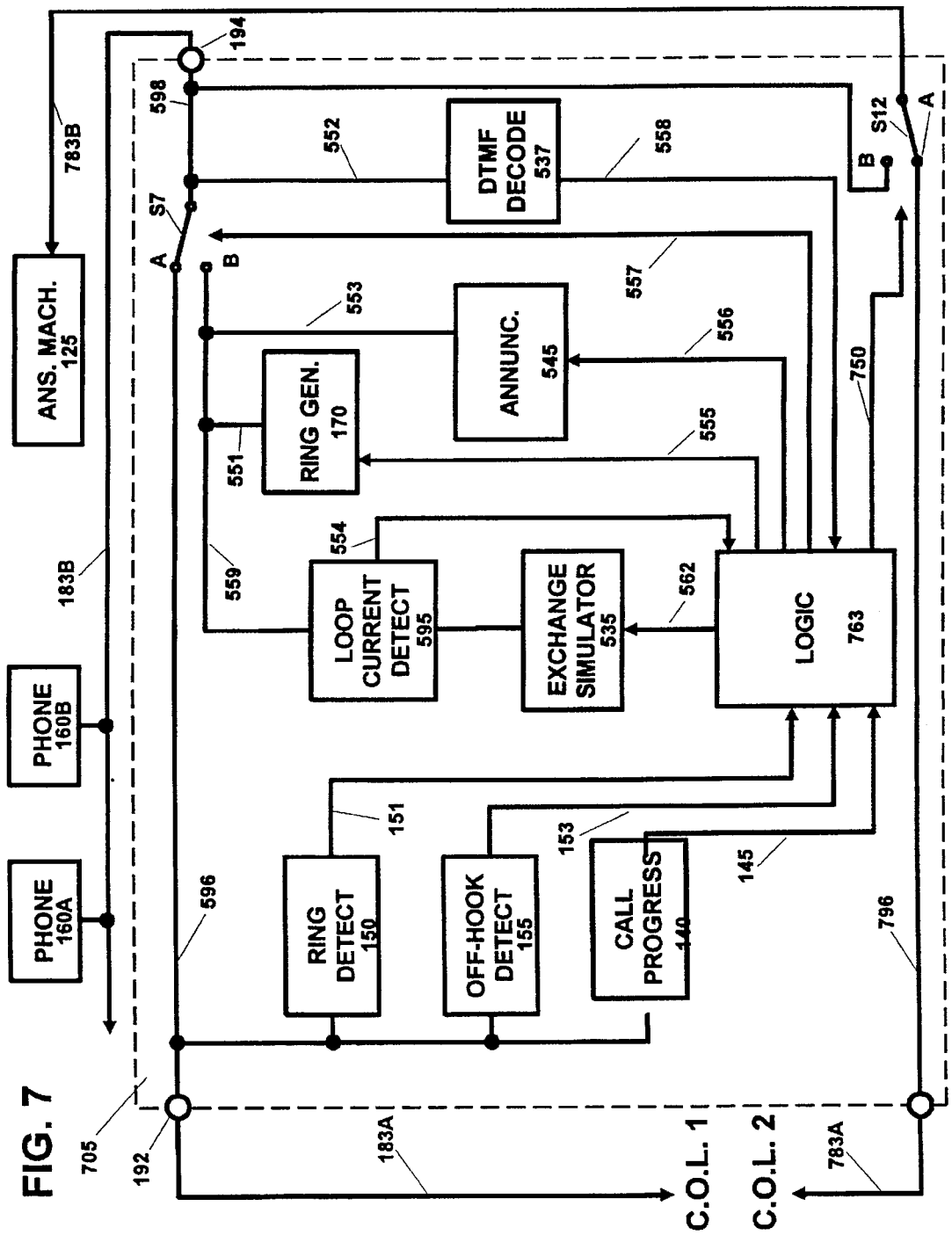
FIG. 7 is a block circuit diagram of an alternative embodiment of the present invention, for use with two telephone lines.

Referring now to FIG. 7, there is shown a variation on the embodiment of FIG. 6, in which a local remote-control circuit 705 is coupled to a plurality of incoming telephone lines (C.O.L. 1 and C.O.L. 2) via telephone lines 183 and 783. The controller is coupled to Central Office Line 1 via telephone line 183A, and to Central Office Line 2 via telephone line 783A. A plurality of telephones 160A and 160B are coupled in a conventional manner to portion 183B of the telephone line coupled to C.O.L. 1 (of course, fewer or more such telephones may be coupled to the line), and answering machine 125 is coupled to the second telephone line via telephone line portion 783B. (Although not shown in FIG. 7, it will be appreciated that one or more telephones also may be coupled to the second telephone line by coupling the telephones to line 783B, in parallel with answering machine 125, in a conventional manner.)

Controller 705 is similar to controller 605 of FIG. 6, except for the addition and control of switch S12 coupled (via conductors 796) between telephone line portions 783A and 783B. Switch S12 preferably is the same type as switch S7 (i.e., a double pole, double throw relay). Switch S12 is actuated to be either in position A or position B by a control signal sent by Logic circuit 763 via control line 750. When the switch is in position A (the default position when controller 705 is in its first mode of operation), telephone line 783B (and, hence, any devices coupled to it—including answering machine 125 and any telephones)—are coupled to Central Office Line 2. Thus, in the default state of controller 705, answering machine 125 and any telephones coupled to telephone line portion 783B will operate in their conventional manner as if controller 705 were not present.

In the second (local remote-control) mode of operation of controller 705, caused by the transmission from one of the telephones 160 of a local remote-control security code, switch S12 is actuated to be in position B (as is switch S7, as previously described). With switch S12 in position B, the Tip and Ring conductors of telephone line portion 783B are operatively disconnected from Central Office Line 2 and connected instead to the corresponding Tip and Ring conductors of telephone line portion 183B. This enables answering machine 125, although coupled in the default mode of operation of controller 705 to a different telephone line than are telephones 160, to be remotely controlled by any of local remote-control telephones 160 as previously described.

The circuit of FIG. 7 may be further modified to provide for monitoring of Central Office Line 2 while switch S12 is in position B, in order to enable an incoming telephone call on that line to be answered while a local remote-control telephone on the other telephone line is being used to retrieve messages from answering machine 125. This may be accomplished, in a preferred manner, by providing a second Ring Detect circuit, Off-Hook detect circuit and Call Progress circuit coupled to line 796 and to Logic circuit 763 in the manner in which these circuits are coupled to lines 596. Upon detecting the presence of an incoming call from C.O.L. 2 by way of this additional circuitry (as already described), Logic circuit 763 (either automatically or upon receipt of a command signal sent from a local remote-control telephone 160, as earlier described) re-enters its default state of operation and actuates switches S7 and S12 back to their respective default positions A. Following this, a telephone coupled to C.O.L. 2 (telephone line portion 783B) may be used to answer the call on its telephone line.

While any of telephones 160 coupled to telephone line 183B may be used in the embodiment of FIG. 7 to retrieve messages or otherwise to remote control answering machine 125 without the necessity of placing a telephone call from Central Office Line 1 to Central Office Line 2, the same is not true for a telephone that might be coupled to telephone line 783B. That is to say, a telephone coupled to telephone line 783B could not be used—in the particular embodiment of FIG. 7—to retrieve messages from or otherwise to control answering machine 125, or such an answering machine that might instead be coupled to line 183B. It will be appreciated, however, that FIG. 7 could be modified further to provide such capability by the addition to FIG. 7 of a second DTMF decode circuit coupled to the common pole of switch S12 and to Logic circuit 563 to detect the presence of a local remote-control security code transmitted (while controller 705 is in its default state of operation) from a telephone coupled to line 783B. Upon detecting this code, Logic circuit 563 causes controller 705 to enter its second state of operation as before described.

Figure 8:
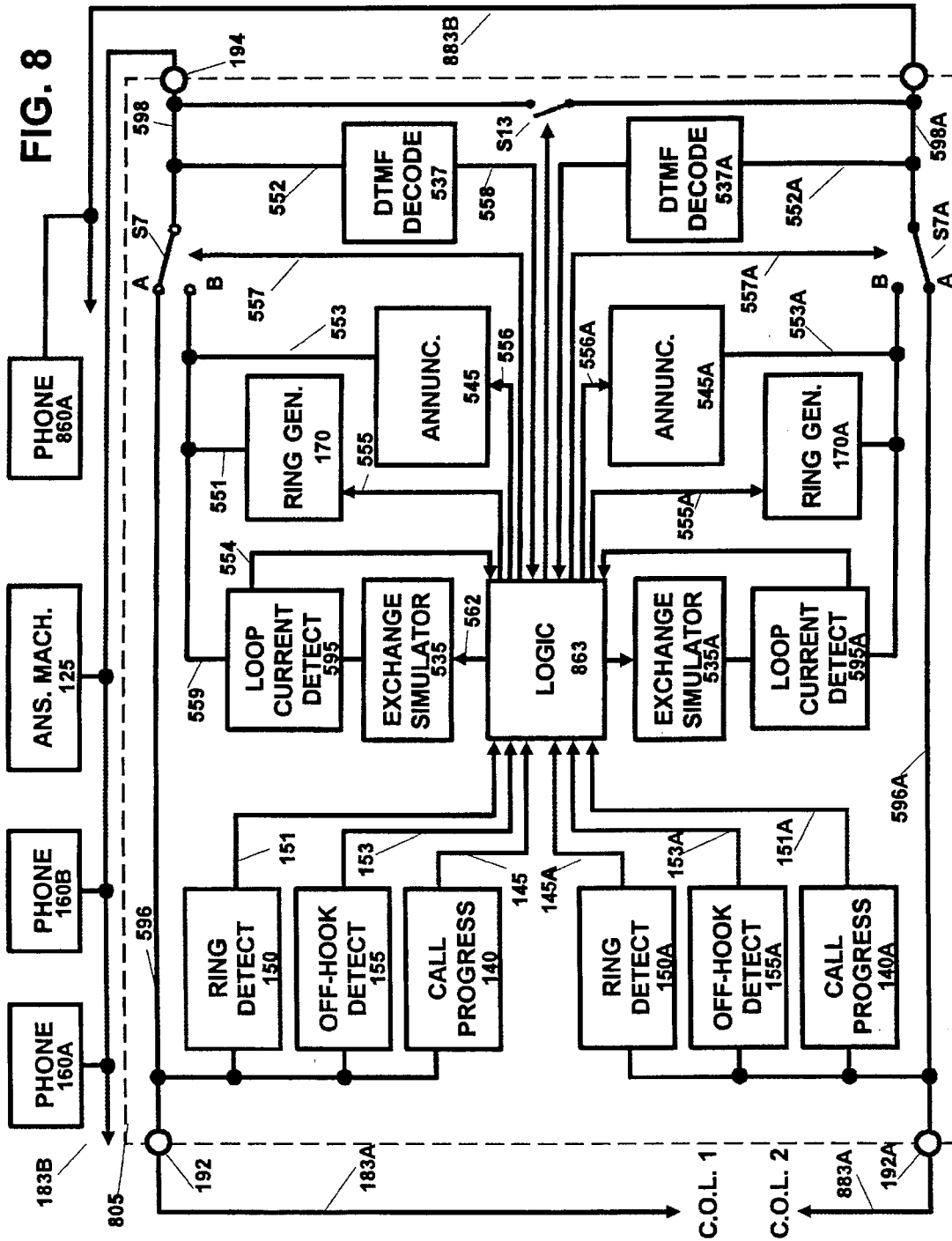
FIG. 8 is a block circuit diagram of an alternative embodiment of the invention for use with two telephone lines.

FIG. 8 shows yet another embodiment of the local remote-control circuit of the present invention, which is adapted for use with two different telephone lines. In FIG. 8, a local remote-control circuit 805 is coupled to a public telephone network via two independent telephone lines C.O.L. 1 and C.O.L. 2. Coupled to the first telephone line 183 are telephones 160 and answering machine 125, as before. The second telephone line has portion 883A coupled to the Central Office, and portion 883B to which is coupled a local remote-control telephone 860A. As can be seen from FIG. 8, the local remote-control circuitry previously described with respect to FIG. 6 has been duplicated for the second telephone line. Thus, controller 805 operates so that any of telephones 160 may be used to retrieve messages or otherwise to control answering machine 125, and telephone 860 (or another telephone coupled to telephone line 883B) may independently be used to retrieve or otherwise to control an answering machine that might be coupled to telephone line 883B (not shown), as previously explained. Thus, it is possible with the circuit of FIG. 8 that switch S7 is in position B (i.e., the top half of the circuit associated with the C.O.L. 1 telephone line is in the second, or local remote-control, state of operation) while switch S7A is in position A (i.e., the bottom half of the circuit associated with the C.O.L. 2 telephone line is in the default state of operation), and vice versa.

In addition, the controller of FIG. 8 enables telephone 860A coupled to telephone line 883B to retrieve messages from or otherwise to control answering machine 125 coupled to different telephone line 183B. This is accomplished by the provision of a switch S13 (which preferably comprises a single-pole, double throw relay) for selectively interconnecting, under control of Logic circuit 863, the T and R conductors of telephone line 883B to the respective T and R conductors of telephone line 183B. The circuit, with switch S13, operates as follows.

When controller 805 is in its default mode of operation with respect to both telephone lines 183 and 883, so that switches S7 and S7A are each in position A, Logic circuit 863 causes switch S13 to be open. To access answering machine 125, a predetermined local remote-control security code is sent from telephone 860A. Upon receipt by Logic circuit 863 from telephone 860A of the security code, via DTMF decode circuit 537A, Logic circuit 863 determines whether the conditions are appropriate for causing controller 805 to enter its local remote-control state of operation. Thus, as earlier described, Logic circuit 863 determines (via Ring Detect circuit 150A and Off-Hook Detect circuit 155A) that telephone 860A went off-hook at a time when a ringing signal was not being (or had not recently been) received on line 883B, and the security code was received within a predetermined time of the telephone having gone off hook. In addition, Logic circuit 863 determines whether C.O.L. 2 telephone line is on-hook (via Off-Hook Detect circuit 155) and whether there is an incoming telephone call on the line (via Ring Detect circuit 150). If the line is on-hook and not ringing, then Logic circuit 863 causes controller 805 to enter the local remote-control state by actuating each of switches S7 and S7A to position B. Following this, switch S13 is closed (it is preferable to close switch S13 a short period of time after actuation of switches S7 and S7A to ensure that C.O.L. 1 and C.O.L. 2 are not unintentionally cross-coupled). With switches S7 and S7A in position B, telephone lines 183B and 883B are disconnected from the public telephone networks and connected to each other. Logic circuit then generates a synthesized ringing signal (via either of Ring Generators 170A or 170B) to cause answering machine 125 to pick up the line as already described. Following this, telephone 860 may be used to transmit remote-control command signals to answering machine 125 to retrieve messages, to answer an incoming telephone call, and so on, all as previously described.

Thus, a novel system and method has been described for enabling a telephone coupled to a telephone line within a dwelling to retrieve messages from an answering machine coupled to the same or another telephone line within the dwelling, without having to place a call to the answering machine through a public telephone network and without expensive PBX or Key Telephone equipment. In a default mode of operation, the system and method enables conventional telephones and answering machines to operate normally and in their conventional manner. Messages may be retrieved with annoying interference from messages and tones transmitted from the Central Office substantially reduced (or entirely eliminated).

Persons of ordinary skill in the art will recognize that the system and method of the present invention could be implemented using circuit configurations other than those disclosed herein. For example, digital signal cancellation circuitry and techniques could be used rather than the analog circuitry disclosed herein with respect to FIGS. 1–4A. All such modifications are within the scope of the present invention, which is limited only by the claims which follow.

What is claimed is:

1. A circuit for use with a telephone system, said system including a telephone line for coupling to a public telephone network, a telephone answering device coupled to said telephone line at a first location, and a telephone coupled to said telephone line at a second location remote from said first location, said telephone being of a type that is operable in a conventional way to (a) obtain a dial tone for initiating an outgoing telephone call upon causing the telephone line to be in an off-hook state and (b) transmit command signals over said telephone line, and said answering device being of a type that is operable in a conventional way to be (1) operatively connected to said telephone line in order to record a message received via said telephone line and to play back and couple to said telephone line said recorded message, and (2) remotely controlled by command signals received via said telephone network at least to play back said recorded message, said circuit comprising:

first means for causing said telephone line to be operatively connected to said telephone network in a default mode of operation of said circuit, said connection enabling said telephone and said answering device to operate in the aforesaid conventional ways;

second means responsive to a first command signal received from said telephone for causing said telephone line to be operatively disconnected from said telephone network;

third means for causing said answering device to be operatively connected to said telephone line, while said telephone line is operatively disconnected from said telephone network, such that said answering device is remotely controllable by command signals transmitted from said telephone to play back and couple to said telephone line said recorded message; and fourth means for detecting and indicating to a user of said telephone, while said telephone line is operatively disconnected from said telephone network, the presence of an incoming telephone call directed to said telephone line from said telephone network;

whereby the user of said telephone may retrieve said recorded message from said answering device via said telephone, and be informed while retrieving said message of the presence of the incoming telephone call on said telephone line.

2. The circuit of claim 1, wherein said third means for causing said answering device to be operatively connected to said telephone line comprises means for causing said telephone answering device to place said telephone line in an off-hook state.

3. The circuit of claim 1, wherein said circuit is included integrally within said answering device, and wherein said third means for causing said answering device to be operatively connected to said telephone line includes a means for selectively coupling A.C. signals between said telephone line and circuitry of said answering device for playing back said recorded message.

4. The circuit of claim 2, wherein said third means for causing said answering device to place said telephone line in an off-hook state comprises a means for generating and coupling to said telephone line a synthesized ringing signal.

5. The circuit of claim 1, further including:

fifth means for operatively re-connecting said telephone line to said telephone network so that said incoming telephone call is answerable via said telephone.

6. The circuit of claim 5, wherein said fifth means operatively re-connects said telephone line to said telephone network in response to the detection by said fourth means of the presence of said incoming telephone call.

7. The circuit of claim 5, wherein said fifth means operatively re-connects said telephone line to said telephone network in response to at least one of (i) a determination that said telephone has gone on-hook, (ii) a determination that said answering device has gone on-hook, and (iii) a command signal received from said telephone.

8. The circuit of claim 5, wherein said fifth means for detecting and indicating causes a telephone coupled to said telephone line to ring while said telephone line is operatively disconnected from said telephone network.

9. The circuit of claim 8, wherein said fourth means for detecting and indicating causes said telephone line to ring in a distinctive manner to indicate to said user the presence of said incoming telephone call.

10. The circuit of claim 5, wherein said fourth means for detecting and indicating causes a sound to be heard through said telephone to indicate to said user the presence of said incoming telephone call.

11. The circuit of claim 10, wherein said sound comprises a tone.

12. The circuit of claim 10, wherein said sound comprises a synthesized or recorded voice message.

13. A method for use with a telephone system, said system including a telephone line for coupling to a public telephone network, said telephone line having a telephone answering device coupled thereto at a first location and a telephone coupled thereto at a second location remote from said first location, said telephone being of a type that is operable in a conventional way to (a) obtain a dial tone for initiating an outgoing telephone call upon causing the telephone line to be in an off-hook state and (b) transmit commands over said telephone line, and said answering device being of a type that is operable in a conventional way to be (1) operatively connected to said telephone line in order to record a message received via said telephone line and to play back and couple to said telephone line said recorded message, and (2) remotely controlled by command signals received via said telephone line at least to play back said recorded message, said method comprising the steps of:

operatively connecting said telephone line to said telephone network, in a default mode of operation, to enable said telephone and said answering device to operate in the aforesaid conventional ways;

causing said telephone line to be operatively disconnected from said telephone network in response to a first command signal received from said telephone;

causing said answering device to be operatively connected to said telephone line, while said telephone line is operatively disconnected from said telephone network, such that said answering device is remotely controllable by command signals transmitted from said telephone to play back and couple to said telephone line said recorded message; and detecting and indicating to a user of said telephone, while said telephone line is operatively disconnected from said telephone network, the presence of an incoming telephone call directed to said telephone line from said telephone network.

14. The method of claim 13, wherein said step of causing said answering device to be operatively connected to said telephone line includes a step of causing said answering device to place said telephone line in an off-hook state.

15. The method of claim 13, wherein said step of causing said answering device to be operatively connected to said telephone line includes a step of activating a switch means for coupling A.C. signals between said telephone line and circuitry of said answering device for playing back said recorded messages.

16. The method of claim 14, wherein said step of causing said answering device to place said telephone line in an off-hook state includes a step of generating and coupling to said telephone line a synthesized ringing signal.

17. The method of claim 13, further including the step of:

operatively re-connecting said telephone line to said telephone network so that said incoming telephone call is answerable via said telephone.

18. The method of claim 17, wherein said step of operatively re-connecting said telephone line to said telephone network is responsive automatically to the detection of the presence of said incoming telephone call.

19. The method of claim 17, wherein said step of operatively re-connecting said telephone line to said telephone network is responsive to at least one of (i) a determination that said telephone has gone on-hook, (ii) a determination that said answering device has gone on-hook, and (iii) a second command signal received from said telephone.

20. The method of claim 13, wherein said indicating step includes the step of generating and coupling to said telephone line a synthesized ringing signal to cause a telephone coupled to said telephone line to ring while said telephone line is operatively disconnected from said telephone network.

21. The method of claim 20, wherein said synthesized ringing signal causes said telephone line to ring in a distinctive manner to indicate to the user the presence of said incoming telephone call.

22. The method of claim 13, wherein said indicating step causes a sound to be heard through said telephone to indicate to the user the presence of said incoming telephone call.

23. The method of claim 22, wherein said sound comprises a tone.

24. The method of claim 22, wherein said sound comprises a synthesized or recorded voice message.

25. A circuit for enabling a telephone answering device to be remotely controlled by a first telephone, said answering device being of a type for coupling to a first telephone line at a first location along said line and in parallel with said first telephone coupled to said line at a second location along said line remote from said first location, and said answering device further being of a type that is operable, in a first mode of operation, to (1) record messages transmitted to the answering device from a second telephone coupled to a second telephone line that in turn is coupled to said first telephone line via a public telephone network, and (2) be remotely controlled by command signals transmitted to the answering device from said second telephone via said telephone network at least to cause messages recorded by said answering device to be played back and coupled to said first telephone line for transmission via said telephone network to said second telephone, said circuit comprising:

first means for enabling said answering device to operate in said first mode of operation, and second means for enabling said answering device to operate in a second mode of operation, said second means including:

(A) a circuit for enabling said answering device to be remotely controlled, by command signals transmitted to the answering device from said first telephone, to play back a recorded message through said first telephone such that the played back message may be heard by a user of said first telephone, (B) a circuit for reducing interference between the played back recorded message being heard through said first telephone and audio signals transmitted from said telephone network to said first telephone line during said play back, and (C) a circuit for indicating to a user of said first telephone, during said play back of said recorded message, the presence of an incoming telephone call directed to said first telephone line.

26. The circuit of claim 25, wherein said circuit for reducing interference operatively disconnects said first telephone line from said telephone network while said recorded message is being played back.

27. The circuit of claim 25, wherein said circuit for indicating causes a sound to be heard through said first telephone to indicate the presence of said incoming telephone call.

28. The circuit of claim 25, wherein said circuit for indicating causes said first telephone to ring to indicate the presence of said incoming telephone call.

* * * * *